United States Patent
Fini et al.

(10) Patent No.: US 9,507,084 B2
(45) Date of Patent: *Nov. 29, 2016

(54) SINGLE-MODE, BEND-COMPENSATED, LARGE-MODE-AREA OPTICAL FIBERS DESIGNED TO ACCOMODATE SIMPLIFIED FABRICATION AND TIGHTER BENDS

(71) Applicant: OFS Fitel, LLC, Norcross, GA (US)

(72) Inventors: John M Fini, Metuchen, NJ (US); Jeffrey W Nicholson, Warren, NJ (US); Thierry F Taunay, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/300,602

(22) Filed: Jun. 10, 2014

(65) Prior Publication Data

US 2015/0293300 A1 Oct. 15, 2015

Related U.S. Application Data

(63) Continuation-in-part of application No. 13/990,921, filed on May 31, 2013.

(60) Provisional application No. 61/833,445, filed on Jun. 10, 2013.

(51) Int. Cl.
*G02B 6/028* (2006.01)
*G02B 6/036* (2006.01)
*G02B 6/02* (2006.01)

(52) U.S. Cl.
CPC ......... *G02B 6/0285* (2013.01); *G02B 6/02019* (2013.01); *G02B 6/0286* (2013.01); *G02B 6/03633* (2013.01)

(58) Field of Classification Search
CPC .. G02B 6/028; G02B 6/0283; G02B 6/0286; G02B 6/0365
See application file for complete search history.

(56) References Cited

U.S. PATENT DOCUMENTS

| | | | |
|---|---|---|---|
| 5,492,552 A | 2/1996 | Cronk et al. | |
| 7,257,293 B1 | 8/2007 | Fini et al. | |
| 7,764,854 B2 | 7/2010 | Fini | |
| 7,783,149 B2 | 8/2010 | Fini | |
| 7,851,459 B2 | 12/2010 | McMahon et al. | |
| 7,876,495 B1 | 1/2011 | Minelly | |
| 7,920,767 B2 | 4/2011 | Fini | |
| 9,207,395 B2 * | 12/2015 | Fini | G02B 6/02009 |
| 2011/0044596 A1 * | 2/2011 | Zhang | G02B 6/0288 385/124 |

OTHER PUBLICATIONS

Fini, "Large mode area fibers with asymmetric bend compensation," Optics Express, vol. 19, No. 22, pp. 21866-21873 (Oct. 2011).
Nicholson et al., "Spatially and spectrally resolved imaging of modal content in large-mode-area fibers," Optics Express, vol. 16, No. 10, pp. 7233-7243 (May 2008).

(Continued)

*Primary Examiner* — Michelle R Connelly
(74) *Attorney, Agent, or Firm* — Michael J. Urbano, Esq.

(57) ABSTRACT

Described is a general strategy of bend-compensated, single-mode LMA fibers extended into a regime with higher total index contrast and where a larger gradient is used to cancel the perturbation of a tighter anticipated bend.

11 Claims, 10 Drawing Sheets

(56) References Cited

OTHER PUBLICATIONS

Nagano et al., "Change of the refractive index in an optical fiber due to external forces," Applied Optics, vol. 17, No. 13, pp. 2080-2085 (Jul. 1978).

Fini., "Design of large-mode-area amplifier fibers resistant to bend-induced distortion," Opt. Soc. Am. B, vol. 24, No. 8, pp. 1669-1676 (Aug. 2007).

Fini, "Bend-resistant design of conventional and microstructure fibers with very large mode area," Optics Express, vol. 14, No. 1, pp. 69-81 (Jan. 2006).

Fini & Nicholson, "Bend compensated large-mode-area fibers: achieving robust single-modedness with transformation optics," Optics Express, vol. 21, No. 16, 19173 (Aug. 2013).

Fini & Nicholson, "Design of single-moded, large-mode-area fibers with symmetric bend compensation," CLEO Tech Digest, CM31.3 (2013).

Carter et al., "Robustly single-mode polarization maintaining Er/Yb co-doped LMA fiber for high power applications," Lasers and Electro-Optics, (4 pages) ADA534434 (2007).

Dilley et al., "High SBS-threshold, narrowband, erbium codoped with ytterbium fiber amplifier pulses frequency-doubled to 770 nm," Optics Express, vol. 15, No. 22, pp. 14389-14395 (2007).

\* cited by examiner (LOOSE BEND)

(TIGHTER BEND)

(NO BEND)

(TIGHTER BEND)

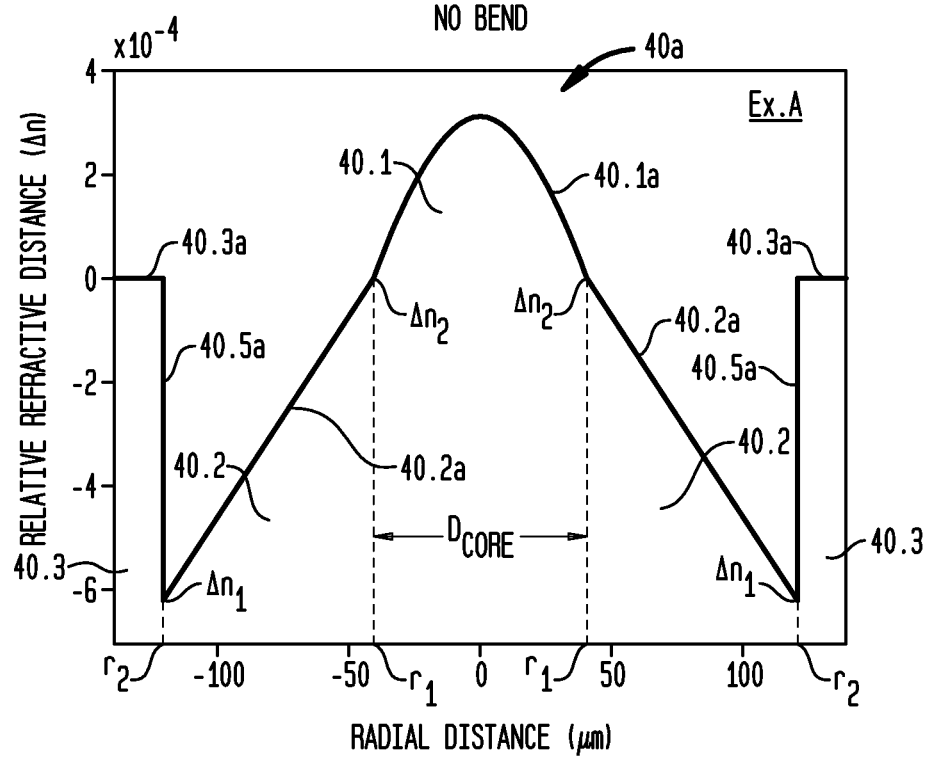
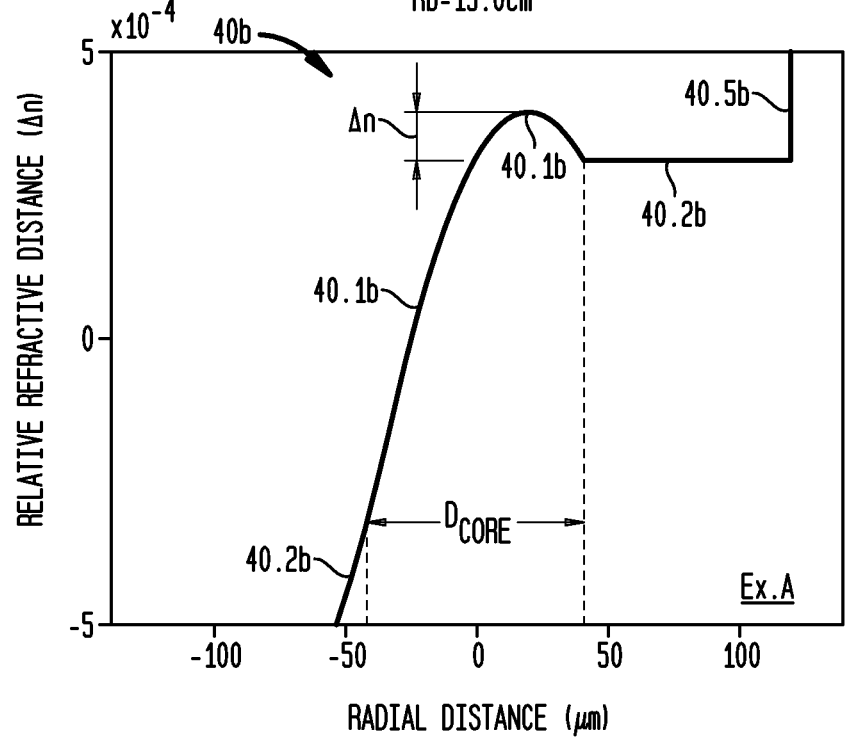

NO BEND

Rb=15.0cm

NO BEND

SINGLE-MODE, BEND-COMPENSATED, LARGE-MODE-AREA OPTICAL FIBERS DESIGNED TO ACCOMODATE SIMPLIFIED FABRICATION AND TIGHTER BENDS

CROSS-REFERENCE TO RELATED APPLICATIONS

This application claims priority from provisional application Ser. No. 61/833,445 filed on Jun. 10, 2013 and is a continuation-in-part of parent application Ser. No. 13/990,921 (Fini 21-31) filed on May 31, 2013. The parent application claims priority from PCT application No. PCT/US11/63351 filed on Dec. 5, 2011 as well as from two provisional applications: Ser. No. 61/506,631 filed on Jul. 11, 2011 and Ser. No. 61/419,420 filed on Dec. 3, 2010. All of these documents are incorporated by reference herein.

BACKGROUND OF THE INVENTION

Field of the Invention

This invention relates to large-mode-area (LMA) fibers designed to compensate for the effects of bends in the fiber and to suppress higher-order modes (HOMs) and, more particularly to high power optical amplifiers that incorporate such LMA fibers.

Discussion of the Related Art

Optical fiber amplifiers have great impact in diverse applications ranging from high power devices used for cutting, welding and range finding to lower power devices used to amplify optical carrier signals in telecommunication systems. In the former case, the high power amplifier utilizes a gain-producing fiber (GPF; e.g., a LMA fiber doped with suitable rare-earth species or chromium) and a source of pump light to amplify signal light propagating in effectively a single mode (i.e., the fundamental transverse mode) through the LMA fiber.

LMA fibers, which have a relatively large effective area ($A_{\mathit{eff}}$), are used to reduce optical power density and, therefore, also reduce optical nonlinearities in the fiber. However, larger area fibers typically support several or many modes, increasing the likelihood that HOMs will also propagate in the fiber and undergo amplification, thereby degrading the quality of beam. Beam quality is often characterized in terms of a parameter known as $M^2$ ($M^2=1$ for an ideal Gaussian beam), whereas single modedness can be characterized by various techniques including spatially and spectrally ($S^2$) resolved imaging, as described by Nicholson et al., *Optics Express*, Vo. 16, No. 10, pp. 7233-7243 (2008), which is incorporated herein by reference. Bends in the fiber exacerbate this problem they reduce the ability of various fiber designs to selectively suppress HOMs while ensuring propagation of the fundamental mode at power levels that satisfy typical performance requirements.

In a typical conventional amplifier configuration a few meters (e.g., 5 m) of GPF is coiled within an amplifier package that may also contain other components of the amplifier. In some designs, those components include a non-GPF LMA (e.g., a fiber pigtail) optically coupled to the GPF. Coiling the LMA fiber, an expedient to save space, means that the fiber is bent.

Bends in the LMA fiber are a key factor imposing performance tradeoffs between three principal goals of LMA fiber design: large mode area, low loss, and single-mode operation. Macrobend loss is often the dominant source of loss, bend distortion limits the scaling of area, and bends degrade single-mode operation, as noted above, by limiting the degree to which unwanted HOMs can be selectively suppressed.

One strategy for ameliorating the adverse effects of bending is to pre-compensate the refractive index profile of an unbent (as-fabricated, straight) fiber for the expected bend-induced perturbation, as described by Fini, *Opt. Express*, Vol. 14, No. 1, pp. 69-81 (2006), which is incorporated herein by reference. This strategy, which utilizes an asymmetric index profile, has been exploited by others in the design of bend-compensated microstructure fibers. [See, for example, Minelly, U.S. Pat. No. 7,876,495 (2011), which is also incorporated herein by reference.] However, this strategy may be difficult to implement. It requires an asymmetric index profile across the fiber cross-section, and it requires deployment of the fiber in a fixed azimuthal orientation throughout the bend.

By the terms unbent, straight, and as fabricated we mean the bend radius of the fiber is essentially infinite (a perfectly straight fiber) or so large that any resulting bend would have an insignificant effect on the fiber performance for the intended application of the fiber.

As noted in the aforesaid parent application (Fini 21-31), there is a need for an LMA fiber design that provides (i) bend compensation without requiring an asymmetric index profile (either asymmetric or symmetric index profiles are suitable); and (ii) HOM suppression in addition to compensation.

These needs are addressed by the designs described below. The analysis of bends in LMA fibers, as described in the parent application, has uncovered a surprising result the selectivity of HOM suppression is degraded primarily by the bend perturbation of the inner cladding region, not by perturbation of the core region or other regions of the fiber. Thus, to dramatically improve the basic performance tradeoff it is sufficient to compensate the bend perturbation in the inner cladding region. Unlike the prior art, bend compensation accompanied by sufficient HOM suppression requires neither asymmetry of the index profile of the core region nor asymmetry of the index profile across the entire fiber cross-section. However, the principal design features of our invention do not exclude the use of asymmetric index profiles either.

In accordance with a first aspect of the invention described in the parent application, a bend-compensated optical fiber comprises a core region having a longitudinal axis and a cladding region surrounding the core region. The core and cladding regions are configured to support and guide the propagation of signal light in a fundamental transverse mode in the core region in the direction of the fiber axis. The cladding region includes an inner cladding region surrounding the core region and an outer cladding region surrounding the inner cladding region. At least a longitudinal segment of the fiber is configured to be bent or coiled to a bend radius $R_b$. (Bending changes a gradient of the index profile of a straight fiber, producing what is known in the art as an equivalent index profile within the bent segment.) At least the longitudinal fiber segment is pre-compensated in that (i) the transverse cross section of the fiber has a refractive index profile that is approximately azimuthally symmetric with respect to the fiber axis and (ii) the refractive index of at least a transverse portion of the inner cladding region is graded with a slope configured to compensate for the expected change of the gradient in the index profile that would be induced by the bend; that is, to compensate for the expected equivalent index profile.

In one embodiment of the first aspect of the invention described in the parent application, bend compensation of our LMA fiber, with excellent HOM suppression to enable effectively single-mode operation, is achieved by grading the refractive index of the inner cladding region of the LMA fiber, preferably with a slope $\gamma n_{core}/R_b$, where $\gamma$ falls in the range 0.6-1.2; where $\gamma=1$ corresponds to ideal compensation assuming the well-known geometrical conformal mapping [see, Marcuse, *Appl. Opt.*, Vol. 21, p. 4208 (1982), which is incorporated herein by reference.], but preferred designs may include a stress correction (e.g., $\gamma=0.8$) or other adjustments that allow for curvature variations within a coil, etc; $n_{core}$ is the index of the core region; and $R_b$ is the bend radius. [Regarding, bend-induced strain (stress), see, Nagano, *Applied Optics* Vol. 17, No. 13, pp. 2080-2085 (1978), which is also incorporated herein by reference.]

In another embodiment of the first aspect of the invention described in the parent application, the inner cladding region is annular having an inner radius $r_1$ and an outer radius $r_2$ such that the ratio $r_2/r_1$ is configured to suppress the propagation of HOMs. In some embodiments we prefer $r_2/r_1>2$ and in others we prefer $r_2/r_1>3$ depending on the desired level of HOM suppression.

In accordance with a second aspect of the invention described in the parent application, a bend-compensated optical fiber comprises a core region having a longitudinal axis and a cladding region surrounding the core region. The core and cladding regions are configured to support and guide the propagation of signal light in a fundamental transverse mode in the core region in the direction of the fiber axis. The cladding region includes an inner cladding region surrounding the core region and an outer cladding region surrounding the inner cladding region. At least a longitudinal segment of the fiber is configured to be bent or coiled to a bend radius $R_b$ and at least the longitudinal segment is pre-compensated in that the refractive index of at least a transverse portion of the inner cladding region is graded with a slope configured to compensate for the expected gradient change in the index profile that would be induced by the bend; that is, to compensate for the equivalent index profile. In addition, the inner cladding region is annular having an inner radius $r_1$ and an outer radius $r_2$ such that the ratio $r_2/r_1$ is configured to suppress the propagation of HOMs. In some embodiments of the second aspect of our invention, we prefer $r_2/r_1>2$ and in others we prefer $r_2/r_1>3$ depending on the desired level of HOM suppression.

In some embodiments of the second aspect of the invention described in the parent application, at least a longitudinal segment of the fiber is configured to be bent or coiled to a bend radius $R_b$ and within the segment the transverse cross section of the fiber has a refractive index profile that is approximately azimuthally symmetric with respect to the fiber axis. These symmetric embodiments enable the fiber to be deployed without requiring a fixed azimuthal orientation.

In other embodiments of the second aspect of the invention described in the parent application, at least a longitudinal segment of the fiber is configured to be bent or coiled to a bend radius $R_b$ and within the segment the transverse cross section of the fiber has a refractive index profile that is asymmetric with respect to the fiber axis.

BRIEF SUMMARY OF THE INVENTION

The various designs described in the parent application are further improved in accordance with the present invention by incorporating the following features into modified designs. First, in some of the modified fiber designs the index difference between the core region and the outer cladding region (i.e., the index contrast) allows for easy, low-cost fabrication. Second, if any portion of the core region is doped with gain-producing species, then the modified fiber designs are also made compatible with any composition requirements of the gain-dopants. Third, in some of the modified designs are also made compatible with tighter bends; i.e., typically a bend diameter smaller than 30 cm; illustratively 12 cm.

To address these needs, the general strategy of bend-compensated LMA fibers, as described in the parent application, has been extended into a regime characterized by a higher total index contrast and a larger, steeper gradient to cancel the perturbation induced by a tighter anticipated bend. A higher index contrast means the core region has an index ($n_{core}$) more than approximately 0.0010 above the index of the outer cladding region ($n_{out}$); that is, $(n_{core}-n_{out})\geq 0.0010$ approximately. This contrast level is highly desirable because it allows simultaneous use of a relatively undoped outer cladding region and a heavily up-doped core region.

The inventive fibers are designed for use with bend diameters less than 30 cm, such as, for example, between 8 and 24 cm, preferably between 10 and 20 cm, and more preferably between 12 and 18 cm.

Thus, an embodiment of the present invention includes a bend-compensated LMA optical fiber having a core region (refractive index $n_{core}$), a cladding region surrounding the core region, the core and cladding regions being configured to support and guide a signal in a fundamental transverse mode in the core region. The cladding region further includes an inner cladding region surrounding the core region and an outer cladding region (refractive index $n_{out}$) surrounding the inner cladding region. Some or all of the refractive index profile of the inner cladding region is graded and, therefore, exhibits a slope. When the fiber is bent to a bend diameter of less than 30 cm, the inventive design of the fiber precompensates for the change generated to the index profile created by this bending.

As discussed previously, the fiber may be configured to satisfy the condition $(n_{core}-n_{out})>0.0010$. Additionally, the core region may be doped with well-known gain-producing species (i.e., gain dopants).

Alternatively, some embodiments of the fiber design includes a flat pedestal region having a refractive index $n_{ped}$ located between the core region and the inner cladding region. In one embodiment of this design, the inner cladding region comprises at least a transverse portion in which the index profile is graded with a slope from a refractive $n_1$ at a radius $r_1$ to a refractive index $n_2$ at a radius $r_2$, wherein $n_1>n_2$, $r_2>r_1$, and $(n_1-n_2)>(r_2-r_1)\times 10^{-5}/\mu m$. In another embodiment of this design, the core contrast $(n_{core}-n_{out})>0.0010$, $(n_{core}-n_{ped})>0.0009$, and $(n_{ped}-n_{out})>0.0009$, A relatively undoped outer cladding region is desirable for ease of fabrication, as such materials are commercially available as overclad tubes, and can also be easily and cheaply made. A heavily up-doped core region is often required to provide a high concentration of gain dopants (e.g., Yb) while avoiding photodarkening. The specific index contrast value of 0.0010 is illustrative and process dependent; advances in MCVD processing may open up a favorable regime with slightly lower $(n_{core}-n_{out})$, or process restrictions or yield considerations may require that $(n_{core}-n_{out})$ be larger (say >0.0012 or >0.0015). Highly up-doped cores may be desirable for their photosensitivity or acoustic properties as well. Generally, the desire for relatively large $(n_{core}-n_{out})$ is incompatible with the desire to simultaneously achieve large mode area and good suppression of higher-order modes (HOMs). By including a graded bend-compensation region in the fiber (or a stepped approximation to the bend-compensation gradient), the present invention achieves a large ($n_{core}-n_{out}$) while also maintaining HOM suppression much better than conventional designs.

The larger index contrast of the present invention also means it is compatible with packaging in smaller coils and more generally with fiber handling that may result in tighter bend curvature. While our previous designs focus on scalability of mode area (to achieve the ultimate high-power limits), some embodiments of the present invention focus on compatibility and ease of use, making the inventive designs applicable to a larger range of applications and customer requirements.

Some embodiments of the present invention are also able to achieve desirable performance even if less stringent fabrication irregularities are assumed, compared with previous bend-compensated designs. In some embodiments, the designs are simplified so that the bend-compensation region consists of a small number of steps or even a single step in gradation. Simulations show that even a single step, if properly designed, approximates the bend-compensation slope and leads to an improved tradeoff between mode area, bend loss, and single-modedness.

Some embodiments of the current invention have the advantage of having low estimated splice loss with step-index fibers of similar mode field diameter that might be used for input or output coupling, delivery, etc.

In one embodiment of the present invention, the fiber is cabled so that the local curvature is maintained within a desirable range, although the cable may be straight or arranged in a less controlled fashion. Such a cabled fiber may be used as a delivery fiber for delivering high power signals or for delivering high-energy pulses. Furthermore, the cable may be configured such that the fiber is arranged helically inside the cable.

In another embodiment of the present invention, a bend-compensated fiber comprises an inner portion including a core region and a lower refractive index inner cladding region surrounding the core region, an intermediate portion surrounding the inner cladding region, and an outer portion surrounding the inner portion. The inner portion is configured to provide higher loss to HOMs than to the fundamental mode, and the intermediate portion is configured so that the equivalent refractive index of the fiber when bent is greater than the effective refractive index of the HOMs and less than or equal to the effective refractive index of the fundamental mode.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIG. 4 shows schematic graphs of the relative refractive index profiles of a symmetric bend-compensated (SBC) fiber in accordance with another illustrative embodiment of our invention, wherein the fiber has been subjected to no bend (FIG. 4A) and a bend having a radius $R_b$=15 cm (FIG. 4B);

FIG. 13A shows the index profile in the absence of a bend, whereas

where "appx" is an abbreviation for "approximately." On the other hand, In FIG. 13C, for a given fiber design the line depicting the loss variation with bend diameter for the fundamental mode and the corresponding line for HOM loss variation with bend diameter have the same dashed pattern.

Figure 1A:
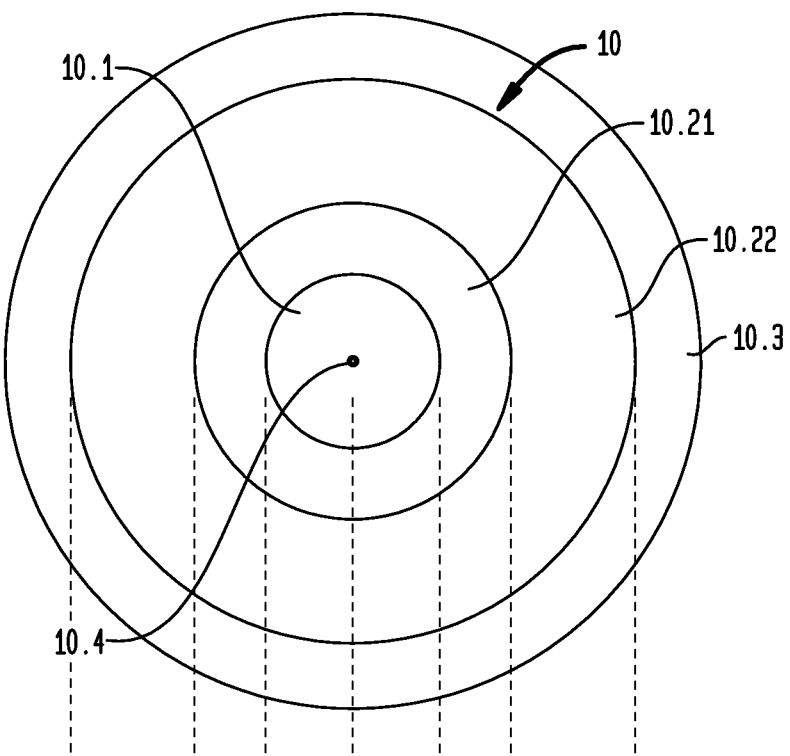
FIG. 1A is a schematic, transverse cross-section of a bend-compensated LMA optical fiber in accordance with one embodiment of our invention.

Various ones of the foregoing figures are shown schematically in that they are not drawn to scale and/or, in the interests of simplicity and clarity of illustration, do not include all of the details of an actual optical fiber or product depicted. In addition, note that the ordinate of FIG. 1B shows the absolute refractive index, whereas the ordinates of FIGS. 4, 5, 7, 12, 13A, 13B, 14A and 15 show the relative refractive index (i.e., indices are relative to the refractive index of the outer cladding region).

GLOSSARY

Bending: Macro-bending, commonly referred to as simply bending, takes place when a fiber is bent, coiled or curled so that its curvature is relatively constant along its length. In contrast, micro-bending takes place when curvature changes significantly within the adiabatic length scale for a particular fiber (e.g., along fiber lengths on the order of a millimeter or less). Such micro-bends are formed, for example, in standard micro-bending tests by pressing the fiber into sand paper.

Center Wavelength: Throughout this discussion references made to wavelength are intended to mean the center wavelength of a particular light emission, it being understood that all such emissions have a characteristic linewidth that includes a well-known range of wavelengths above and below the center wavelength.

Glass Fiber: Optical fiber of the type described herein is typically made of glass (e.g., silica) in which the refractive indices of the core region and of the cladding region are controlled by the amount and type of one or more dopants (e.g., P, Al, Ge, F, Cl) or by hollow voids incorporated therein during the fabrication of the fiber, as is well known in the art. These refractive indices, as well as the thicknesses/diameters of core/cladding regions, determine important operating parameters, as is well known in the art. In order for such glass fibers to produce gain when suitably pumped, they are also doped with a rare-earth species or chromium, as mentioned previously.

Index: The terms index and indices shall mean refractive index and refractive indices. In designs where a particular region (e.g., a cladding region) includes microstructure [e.g., holes, whether filled (e.g., with a low-index gas, liquid or solid) or unfilled (e.g., air-holes)], then the index of such a region is interpreted to mean the average index seen by light propagating in that region.

Index Profile: The schematic index profiles of FIGS. 1B, 2-5, 7, 12, 13A, 13B, 14A and 15 are averages of the actual minute variations of index that would be observable in an optical fiber. In addition, although various regions of the index profile are shown as being rectangular, the boundaries of such regions need not be horizontal or vertical; one or more may be slanted, for example, the region may be trapezoidal or triangular.

LMA: In high-power applications, a large mode area (LMA) fiber is defined as having a fundamental mode effective area greater than or approximately equal to $90\lambda^2$, where $\lambda$ is the signal wavelength. For example, at a wavelength of 1060 nm (1.06 μm), an effective area around 100 μm$^2$ or greater constitutes a large mode area, whereas at a wavelength of at 1550 nm (1.55 μm) an effective area of 216 μm$^2$ or greater constitutes large mode area. Bend compensation becomes particularly important for larger mode areas of around $300\lambda^2$ or greater.

$M^2$: The optical characteristics of a LMA fiber sensitively depend upon the details of its transverse refractive index profile. Conventional wisdom dictates that desirable LMA fibers have a fundamental mode with $M^2$ very near to 1.0, meaning that the optical field of the fundamental transverse mode is very nearly Gaussian in shape under the assumption that the transverse refractive index profile inside the core region is essentially uniform; that is, the refractive index profile is essentially uniform within the transverse cross-section of the core region. $M^2$ measures the similarity between the mode field and a true Gaussian function. More specifically, $M^2=1.0$ for a mode having a Gaussian shape, and $M^2 > 1.0$ for all other mode field shapes.

$M^2$ defines the similarity that the fundamental transverse mode of the fiber has to an ideal Gaussian function, as described by P. A. Belanger, *Optical Engineering*, Vol. 32. No. 9, pp. 2107-2109 (1993), which is incorporated herein by reference. (Although this paper defines $M^2$ for $LP_{01}$ fundamental mode of a step-index optical fiber, the definition is valid for all optical fibers described herein.) In theory $M^2$ may be arbitrarily large, but in practice $M^2$ for GPFs is typically in the range, $1 < M^2 < 10$, approximately. Moreover, $M^2 \sim 1.06$ is typically considered to be small in the sense of $M^2 \sim 1.0$, for example, whereas $M^2 \sim 1.3$ is considered to be large in the sense of $M^2 \gg 1.0$, for example.

When $M^2$ is very near to 1.0 the beam emerging from the fiber may be efficiently collimated or tightly focused to a diffraction limited spot.

Mode: The term mode(s) shall mean the transverse mode(s) of an electromagnetic wave (e.g., signal light, which includes signal light to be amplified in the case of an optical amplifier or the stimulated emission in the case of a laser).

Mode size: The size of an optical mode is characterized by its effective area $A_{eff}$, which is given by:

$$A_{eff} = \frac{\left(\int |E|^2 dA\right)^2}{\int |E|^4 dA}$$

where E is the transverse spatial envelope of the mode's electric field, and the integrations are understood to be performed over the cross-sectional area of the fiber. When the mode-field shape is close to an axisymmetric (i.e., symmetric about the longitudinal axis of rotation of the fiber) Gaussian function, the mode-field diameter (MFD) is an appropriate metric for the diameter of the mode and may be expressed as:

$$MFD = 2\sqrt{\frac{2\int |E|^2 dA}{\int \left|\frac{dE}{dr}\right|^2 dA}}$$

where r is the radial coordinate. When the mode-field shape is exactly equal to an axisymmetric Gaussian function, then $A_{eff} = \pi \times MFD^2/4$.

Radius/Diameter: Although the use of the terms radius and diameter in the foregoing (and following) discussion implies that the cross-sections of the various regions (e.g., core, pedestal, trench, cladding) are circular and/or annular, in practice these regions may be non-circular; for example, they may be elliptical, polygonal, irregular or other more complex shapes. Nevertheless, as is common in the art, we frequently use the terms radius and/or diameter for simplicity and clarity.

Signal Propagation: Although signal light may actually crisscross the longitudinal axis as it propagates along a fiber, it is well understood in the art that the general direction of propagation is fairly stated as being along that axis (e.g., axis 10.4 of FIG. 1A).

Single Mode: References made to light propagation in a single transverse mode are intended to include propagation in essentially or effectively a single mode; that is, in a practical sense perfect suppression of all other modes may not always be possible. However, single mode does imply that the intensity of such other modes is either small or insignificant for the intended application.

Suppressed HOM: The degree to which an HOM needs to be suppressed depends on the particular application. Total or complete suppression is not demanded by many applications, which implies that the continued presence of a relatively low intensity HOM may be tolerable. In many instances it may be sufficient to provide a high degree of attenuation of HOMs compared to attenuation in the fundamental mode. We call this suppression relative or selective. In any event, suppressing HOMs improves system performance by, for example, improving beam quality, reducing total insertion loss, lowering noise in the signal mode, and lowering microbend loss.

Transverse Cross-Section: The phrase transverse cross-section means a cross-section of fiber in a plane perpendicular to the longitudinal axis of the fiber.

Undoped: The term undoped or unintentionally doped means that a region of a fiber, or a starting tube used to form such a region, contains a dopant not intentionally added to or controlled in the region during fabrication, but the term does not exclude low levels of background doping that may be inherently incorporated during the fabrication process.

DETAILED DESCRIPTION OF THE INVENTION

Bend-Compensated LMA Fibers—General Design

In this section of the parent application we describe the design of bend-compensated LMA fibers that are configured to be coiled or bent. Thus, at least a longitudinal segment of the LMA fiber is characterized by a bend radius $R_b$. The coiling or bending of such LMA fibers is often an expedient to save space or satisfy some other physical requirement of a particular application. Typical applications (e.g., optical fiber amplifiers and lasers) will be described in a later section.

Figure 1B:
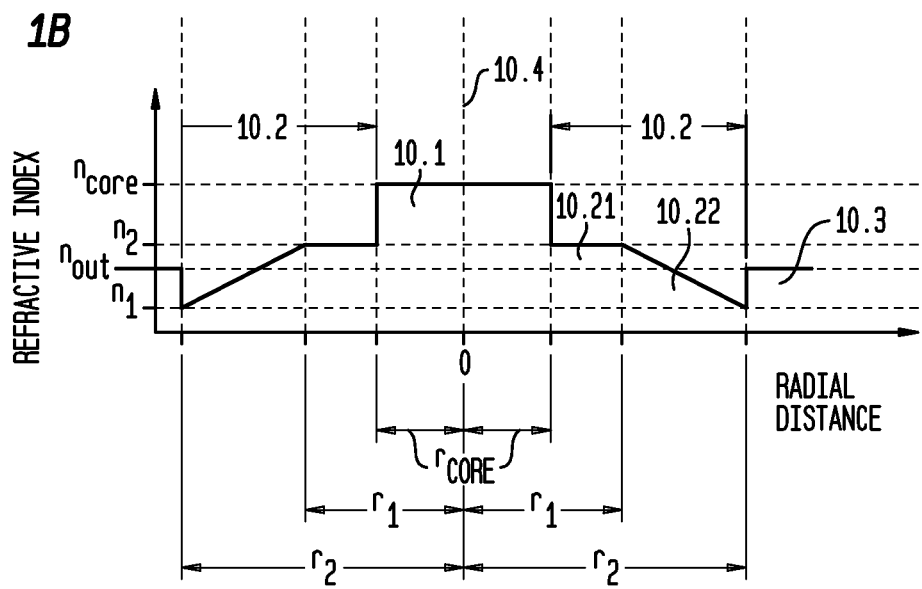
FIG. 1B is a schematic graph of an illustrative symmetric refractive index profile of the fiber of FIG. 1A.

Turning now to FIG. 1A, we show a transverse cross-section of a bend-compensated, LMA optical fiber 10 in accordance with one aspect of our invention. Fiber 10 comprises a core region 10.1, an annular inner cladding region 10.2 surrounding the core region, and an annular outer cladding region 10.3 surrounding the inner cladding region. In general, these regions are configured to support the propagation of signal light effectively in a single mode (i.e., the fundamental transverse mode) in the direction of the longitudinal axis 10.4.

To this end, fiber 10 is designed to suppress the propagation of HOMs, and, in particular, the index profile and radial dimensions of the inner cladding region 10.2 are configured to suppress such HOMs. More specifically, in accordance with one aspect of our invention, fiber 10 illustratively has a symmetric index profile of the type shown in FIG. 1B; that is, the core region 10.1 has an index $n_{core}$, the outer cladding region 10.3 has an index $n_{out}$ (illustratively $n_{out} < n_{core}$), and at least a transverse portion 10.22 of the inner cladding region 10.2 has its index graded between a first value $n_1$ proximate the outer cladding region 10.3 to a second value $n_2$ proximate the core region 10.1, where $n_2 > n_1$. Optionally, the index of the remaining (or pedestal) portion 10.21 of the inner cladding region may not be graded. In some embodiments, however, the entire inner cladding region 10.2 may be graded.

Figure 3A:
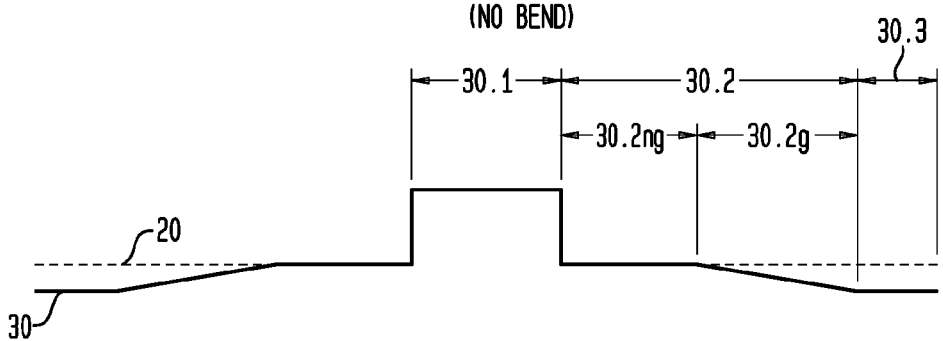
FIG. 3 shows schematic graphs of the refractive index profiles of a bend-compensated SIC fiber in accordance with an illustrative embodiment of our invention, wherein the fiber has been subjected to no bend (FIG. 3A) and a relatively tight bend (FIG. 3B)
Figure 5A:
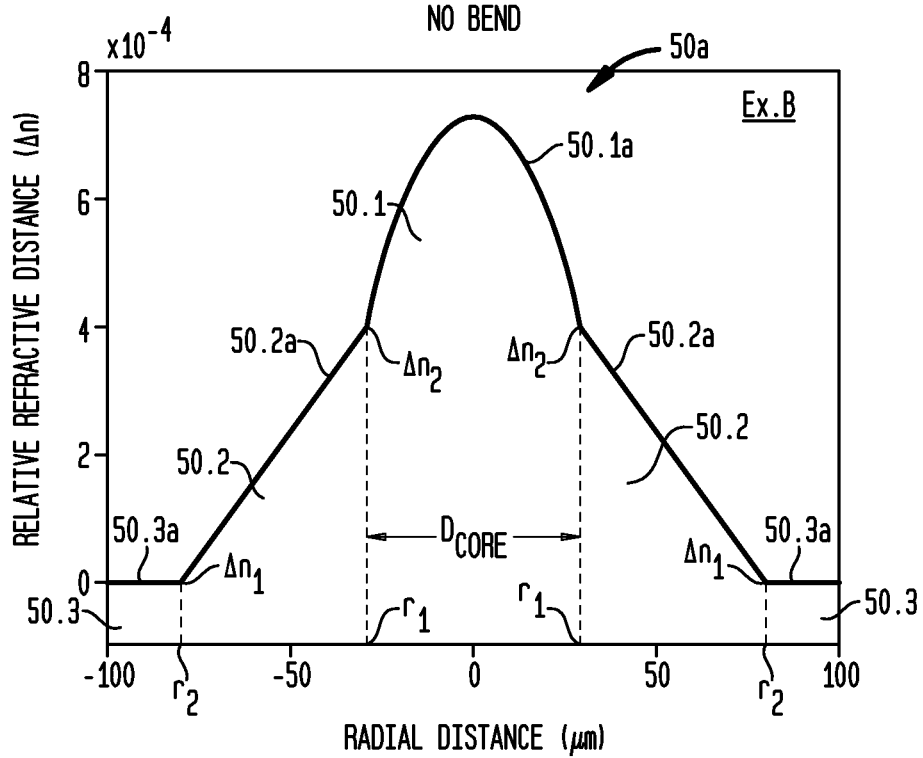
FIG. 5 shows schematic graphs of the refractive index profiles of a SBC fiber in accordance with yet another illustrative embodiment of our invention, wherein the fiber has been subjected to no bend (FIG. 5A) and a bend having a radius $R_b$=15 cm (FIG. 5B)

By symmetric index profile we mean the index profile has azimuthal symmetry; that is, the refractive index of fiber 10 at radius r is approximately equal for all azimuthal angles $\phi$. Thus, symmetry is relative to the longitudinal axis of the fiber, which defines the cylindrical coordinates. In a particular cross-section of the index profile (corresponding to a particular azimuthal angle $\phi$), as illustrated in FIGS. 3A, 4A and 5A, azimuthal symmetry implies reflection symmetry: the index at radial position r approximately equals the index at radial position —r. The approximate azimuthal symmetry of the index profile ensures that variations in orientation do not produce excessive degradation of fiber performance (e.g. HOM suppression). A symmetrical profile may be approximated by various fabrication techniques including stacking, and so an ideally circular or annular region of a symmetrical profile may be approximated by a polygon or polygonal annulus. Accordingly, one may consider certain rotation symmetries (e.g. 6-fold rotation symmetry) as providing an approximate azimuthal symmetry.

In order to suppress HOMs we impose two criteria on this embodiment of the LMA fiber design. One criterion relates to the slope of the graded index portion of the inner cladding region 10.2; the other relates to the radial dimensions of the inner cladding region. Thus, we prefer that the slope of the graded index portion of the inner cladding region 10.2 is approximately equal to $\gamma n_{core}/R_b$, where $\gamma$ is equal 0.6-1.2; that is, $\gamma=1$ would ideally compensate the bend according to well-known geometrical conformal mapping [see, Marcuse, Appl. Opt., Vol. 21, p. 4208 (1982)], but preferred designs may include a stress correction (e.g., $\gamma=0.8$) or other adjustments that allow for curvature variations within a coil, etc. In addition, in some embodiments we prefer that the ratio of the outer radius $r_2$ to the inner radius $r_1$ of the inner cladding region 10.2 satisfies the inequality $r_2/r_1 > 2$ and in others we prefer that $r_2/r_1 > 3$ depending on the desired level of HOM suppression. More specifically, our simulations demonstrate that a moderately thick inner cladding region ($r_2/r_1 > 2$) gives about 1 dB of HOM loss for every 0.1 dB of fundamental mode loss (i.e., HOM loss is about 10× fundamental mode loss), whereas a thicker inner cladding region ($r_2/r_1>3$) provides much higher selectivity—about 10 dB of HOM loss for every 0.1 dB of fundamental mode loss (i.e., HOM loss is about 100× fundamental mode loss).

Figure 2A:
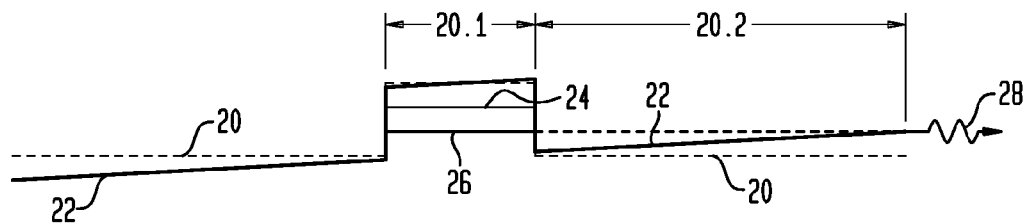
FIG. 2 shows schematic graphs of the refractive index profiles of a conventional step-index-core (SIC) fiber, wherein the fiber has been subjected to a relatively loose bend (FIG. 2A) and a relatively tighter bend (FIG. 2B)
Figure 2B:
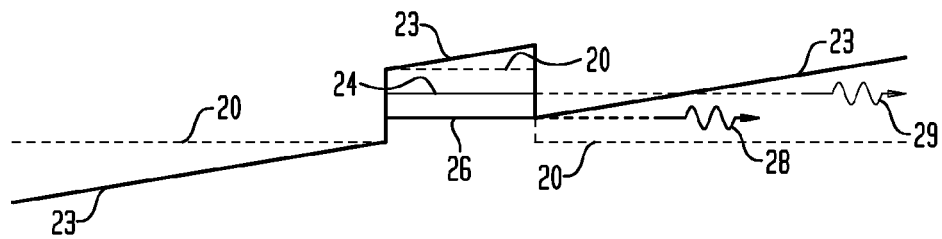
Figure 3B:
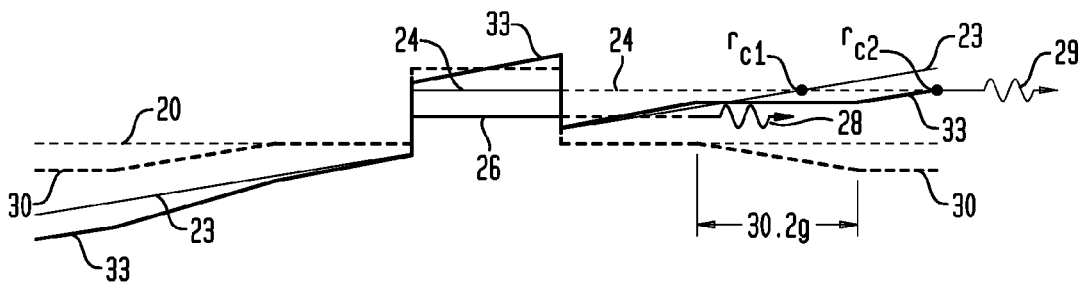

The impact of the inner cladding region on bend compensation and relative HOM suppression can be better appreciated by considering the index profiles shown in FIGS. 2A & 2B and FIGS. 3A & 3B. For purposes of illustration only the profiles of step-index-core (SIC) fibers are depicted in all four figures, but FIG. 2 illustrates a conventional SIC fiber subject to a loose bend (FIG. 2A) and a tighter bend (FIG. 2B), whereas FIG. 3 illustrates a SIC fiber with a portion of the inner cladding graded in accordance with one embodiment of our invention. The case where the fiber is subject to no bend (FIG. 3A) is compared to the case where the fiber is subject to a relatively tight bend (FIG. 3B).

Thus, FIG. 2A includes two equivalent index profiles for the case where a conventional SIC fiber is subject to no bend (profile 20) and to a relatively loose bend (profile 22; e.g., $R_b \sim 50$ cm). The inner cladding 20.2 of the conventional SIC fiber has a uniform or constant index; that is, the inner cladding has no graded index portion. In FIG. 2A, the two equivalent index profiles approximate one another. The fundamental mode (effective index 24) is fully guided, but the HOMs (designated by a single effective index 26 for simplicity) experience tunneling loss, as indicated by wavy arrow 28. Therefore, the tunneling loss of the HOMs is much greater (infinitely greater in theory) than that of the fundamental mode.

As the bend becomes tighter (smaller bend radius; e.g., $R_b \sim 15$ cm), the slope of the index profile increases, as illustrated by profile 23 (FIG. 2B). Under these circumstances, both the fundamental mode and the HOMs experience macrobend tunneling loss as indicated by wavy arrows 29 and 28, respectively. [Macrobend loss is the tunneling of a mode from the core region into a portion of the cladding region where the equivalent index (as indicated by the profile 23) is larger than the mode effective index (as indicated by level 24 in the core region 20.1).] Because the fundamental mode is no longer fully confined to the core region, the ratio of HOM-to-fundamental loss for FIG. 2B is smaller than for FIG. 2A.

One of the key principles we have come to recognize is that the relative confinement of the fundamental mode and the HOMs is determined primarily by the properties of the inner cladding region, particularly the portion of the inner cladding region on the outside of the bend 30.2. FIGS. 3A & 3B schematically demonstrate how inner cladding region impacts bend compensation and relative fundamental-mode-to-HOM confinement (or suppression). Thus, FIG. 3A depicts equivalent index profiles for two straight (no bend) fibers profile 20 is the index profile of a conventional SIC fiber (as in FIG. 2A) and profile 30 is the index profile of a symmetric-bend-compensated (SBC) fiber in which a portion (30.2g) of the inner cladding region 30.2 proximate the outer cladding region 30.3 is graded in accordance with an illustrative embodiment of our invention. (In contrast, the remaining portion 30.2ng proximate the core region 30.1 is not graded.) When the SBC fiber is subjected to a relative tight bend (e.g., $R_b \sim 15$ cm), the profiles change (tilt) as shown in FIG. 3B; that is, the profile 20 of the conventional SIC fiber of FIG. 3A tilts becoming the shape indicated by profile 23 of FIG. 3B. Likewise, the profile 30 of our inventive SBC fiber also tilts becoming the shape indicated by profile 33 of FIG. 3B, but the graded inner cladding region has a significant effect in reducing macrobend loss of the fundamental mode. More specifically, the fundamental mode (wavy arrow 29) must tunnel through a much longer radial distance in our inventive fiber than in a conventional SIC fiber. This relationship is represented by the inequality $r_{c2} \gg r_{c1}$, where $r_{c2}$ is the intersection of an extension of the effective index line 24 of the fundamental mode with the index profile 33 of our inventive SBC fiber, and $r_{c1}$ is the intersection of the same extension of the effective index line 24 of the fundamental mode with the index profile 23 of the conventional SIC fiber. In contrast, tunneling of the HOMs is relatively unaffected, so that the relative confinement of the fundamental mode is greatly improved.

The schematic illustration of FIG. 3 thus shows how our invention can improve fundamental-mode confinement. Since bend loss, effective mode area ($A_{eff}$) and HOM suppression have well known tradeoffs, one skilled in the art can readily apply the principles above to achieve improvements in any of the three.

In addition, we have assumed a step-index (i.e., a constant index in the radial dimension) for the core region of our inventive fibers above only as a pedagogical convenience. Our bend compensation strategy is compatible with a variety of core region index profiles, including, for example, graded profiles such as linearly graded profiles or parabolically graded profiles, or profiles in which the grading is approximately linear or approximately parabolic. Alternatively, the core region profile may include peaks (at/near the center, at/near the outer edge, or both) superimposed on a graded profile. However, the well known advantages of a parabolic core index profile (insensitivity of mode shape to bend radius; low mode displacement) are particularly useful when combined with a bend-compensated inner cladding design of the type described above.

Figure 7A:
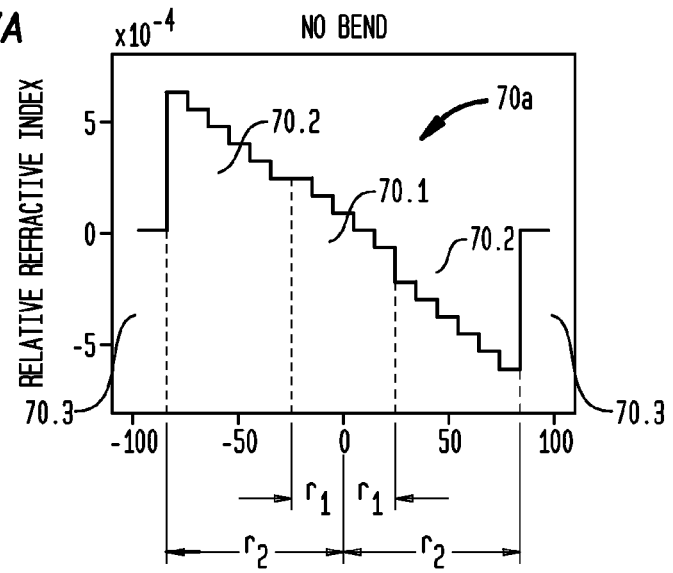
FIG. 7 shows schematic graphs of the relative refractive index profiles of an asymmetric bend-compensated (ABC) fiber in accordance with another illustrative embodiment of our invention, wherein the fiber has been subjected to no bend (FIG. 7A) and a bend having a radius $R_b$=15 cm (FIG. 7B). In addition.
FIG. 7C is a grayscale depiction of the index profile shown in FIG. 7A. Higher index is shown in light gray and white, whereas lower index is shown as dark gray and black.
Figure 7B:
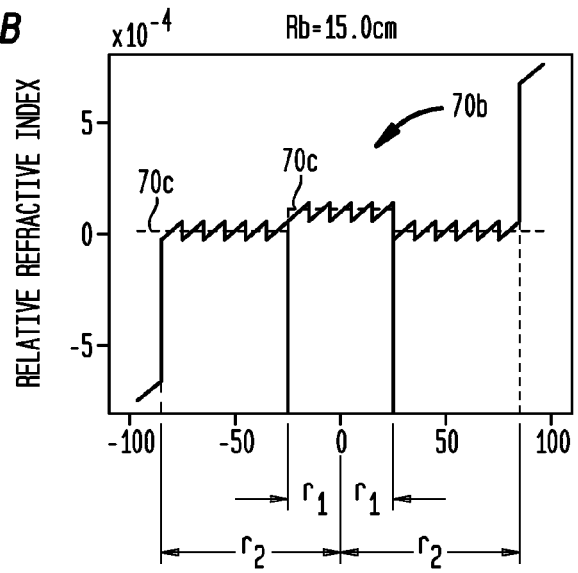

Many embodiments of our invention utilize an overall symmetric index profile, which simplifies both fiber fabrication and apparatus assembly [e.g, at least one optical property such as fundamental mode size, signal attenuation, dispersion, etc. is rendered essentially independent of the azimuthal orientation of the fiber with respect to the direction of the bend]. However, it may nevertheless be advantageous to incorporate the above-described inner cladding features to control HOM suppression in a LMA fiber having an overall asymmetric index profile. By overall index profile we mean the index profile across the essentially the entire transverse cross-section of the fiber. By asymmetric index profile we mean that in sampling the index profile vs. radius at some azimuthal angle $\phi$, the index profile of the LMA fiber at r is not the mirror image of the index profile at —r. Thus, asymmetry is relative to the longitudinal axis of the fiber, as illustrated in FIG. 7A. This is particularly true when the index profile is sampled along an azimuthal angle corresponding to the direction of the anticipated bend.

Symmetric Bend-Compensated (SBC) LMA Fibers—Examples

This section of the parent application describes two designs (designated A and B) of bend-compensated SBC LMA fibers in accordance with illustrative embodiments of our invention. In both of these fiber design the core region is parabolically graded and at least a portion of the inner cladding regions has linearly graded index, but they differ in the presence (Example A) or absence (Example B) of a step in the index profile at the interface between the inner and outer cladding regions. According to the principles illustrated in FIG. 3B, HOMs must be allowed to leak out of the inner cladding region. Therefore, the outer cladding region index cannot be so low that it prevents HOM suppression, but it does not imply a specific value for the outer cladding region index. Thus, designs with and without the aforementioned index step may be desirable.

As SBC fibers, both designs also have symmetric index profiles.

FIG. 4A shows the index profile 40a of Example A2, an effectively single-mode, LMA fiber (unbent) having the following features: a circular core region 40.1 with a parabolic index profile 40.1a; an annular inner cladding region 40.2 with a linearly graded index profile 40.2a (e.g., graded from $\Delta n_2 \sim 0$ at $r_1$ to $\Delta n_1 \sim -6 \times 10^{-4}$ at $r_2$), an annular outer cladding region 40.3 having a uniform (or constant) index profile 40.3a, and an index step 40.5a at the interface between the inner cladding region and the outer cladding region. We describe below the physical characteristics and performance of three fibers (A1, A2, A3) of the same design type as fiber A2.

Similarly, FIG. 5A shows the index profile 50 of Example B, a single-mode, LMA fiber (unbent) having the following features: a circular core region 50.1 with a parabolic index profile 50.1a; an annular inner cladding region 50.2 with a linearly graded index profile 50.2a (e.g., graded from $\Delta n_2 \sim -4 \times 10^{-4}$ at $r_1$ to $\Delta n_1 \sim 0$ at $r_2$), and an annular outer cladding region 50.3 having a uniform (or constant) index profile 50.3a. In contrast with Example A, the LMA fiber of Example B has no index step at the interface between the inner cladding region and the outer cladding region. We describe below a single fiber having the physical characteristics and performance of this design.

Figure 6:
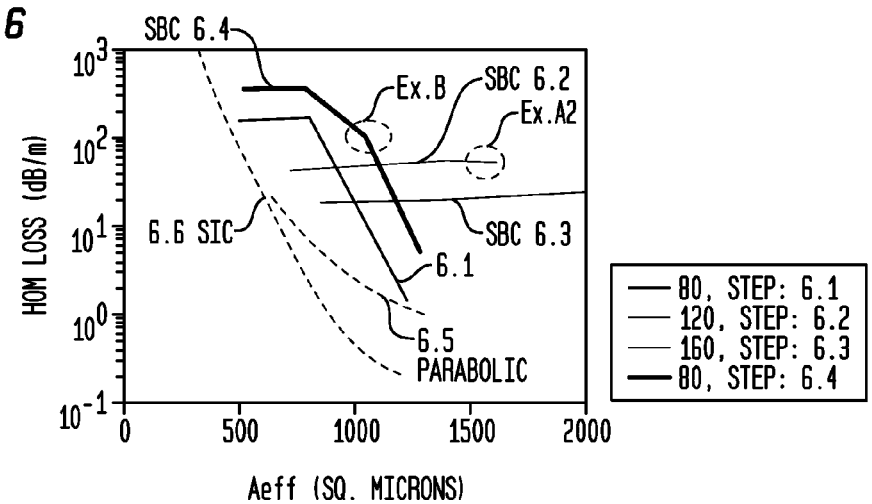
FIG. 6 shows a series of graphs of HOM loss vs. effective area ($A_{eff}$) comparing simulated results for a conventional SIC fiber (curve 6.6), a parabolic core index fiber (curve 6.5) and a multiplicity of SBC optical fibers in accordance with various embodiments of our invention (curves 6-1-6.4)

Table I lists various physical characteristics of the LMA fibers of Examples A and B, as indicated by FIG. 4A and FIG. 5A, respectively, as well as a performance characteristic (e.g., $A_{eff}$) as indicated by FIG. 6. For all of these example fibers, $D_{core} = 2r_1$.

of FIG. 4B has shifted up on the right side (positive radial distances toward the outside radius of the bend, which increases index) and down on the left (negative radial distances toward the inside radius of the bend, which decreases index). Consequently, the graded portion 40.2a of the inner cladding region 40.2 (FIG. 4A) reconfigures into the horizontal portion 40.2b (FIG. 4B). Likewise, the parabolic core region index profile 40.1a reconfigures into an equivalent index "hump" 40.1b, which guides the fundamental mode in the bent or coiled segment of the overall LMA fiber. Thus, FIG. 4B indicates that actual guidance in coiled or bent fiber with $R_b = 15$ cm is provided by an equivalent index peak $\Delta n \sim 1 \times 10^{-4}$, which would be the approximate precision required in fabrication of the fiber.

Our simulations show that both of the designs described above have excellent performance characteristics, as illustrated by FIG. 6, which shows HOM suppression vs. effective mode area ($A_{eff}$) for a both conventional LMA designs (curve 6.6 for a conventional SIC fiber; curve 6.5 for a conventional fiber having a parabolic index core region) and our inventive LMA designs (curves 6.1-6.4). The key design tradeoffs are among fundamental mode area, HOM suppression, and bend loss. This three way tradeoff can be illustrated in a two-dimensional plot by comparing designs with the same fundamental bend loss. FIG. 6 shows such a comparison, where the fundamental bend loss is approximately 0.1 dB/m for all designs. This particular bend loss value was selected so that the total loss in a few-meter-long segment of gain fiber would be tolerable (e.g., 0.5 dB in 5 m). This procedure can be applied with different values of fundamental loss, bend radius, etc. according to various system-level design requirements (e.g., length required for adequate pump absorption, acceptable package size, etc).

TABLE I

| Example | $A_{eff}$ ($\mu m^2$) | $n_{core} - n_{out}$ ($\times 10^{-4}$) | $n_2 - n_1$ ($\times 10^{-4}$) | $r_1$ ($\mu m$) | $r_2$ ($\mu m$) | $r_2/r_1$ | $(n_2 - n_1/r_2 - r_1)$ ($m^{-1}$) | $n_{out} - n_1$ "step" ($\times 10^{-4}$) |
|---------|---------|---------|---------|-----|-----|-------|---------|---------|
| A1 | 1100 | 2.7 | 7.7 | 20 | 120 | 6 | 7.7 | 7.7 |
| A2 | ~1620 | 3.1 | 6.2 | 40 | 120 | 3 | 7.8 | 6.2 |
| A3 | ~2020 | 2.9 | 9.3 | 40 | 160 | 4 | 7.8 | 9.3 |
| B | 1050 | 7.3 | 3.8 | 30 | 80 | ~2.7 | 7.6 | 0 |

For each of these fibers, $(n_2-n_1)/(r_2-r_1) \approx 7.7/m$, in agreement with the requirement that this slope compensate the bend induced gradient $\gamma n_{core}/R_b = 7.7/m$. In this gradient calculation, we assumed $\gamma = 0.8$ (to accommodate stress in the fiber), $R_b = 15$ cm (a representative bend radius requirement for reasonable coil size of a LMA fibers in an optical fiber amplifier), and $n_{core} = 1.45$. The index value of 1.45 corresponds to that of pure (undoped) silica at a wavelength of about 1000 nm and is a good approximation to the index (i) at other wavelengths of interest (e.g., core=1.444 at a wavelength of about 1550 nm) and (ii) at other doping levels typical of doped core regions of LMA fibers (i.e., index differences due to doping are typically much less than 0.01; these differences are important for guidance, but have negligible impact on this expression for the bend-induced gradient).

Figure 5B:
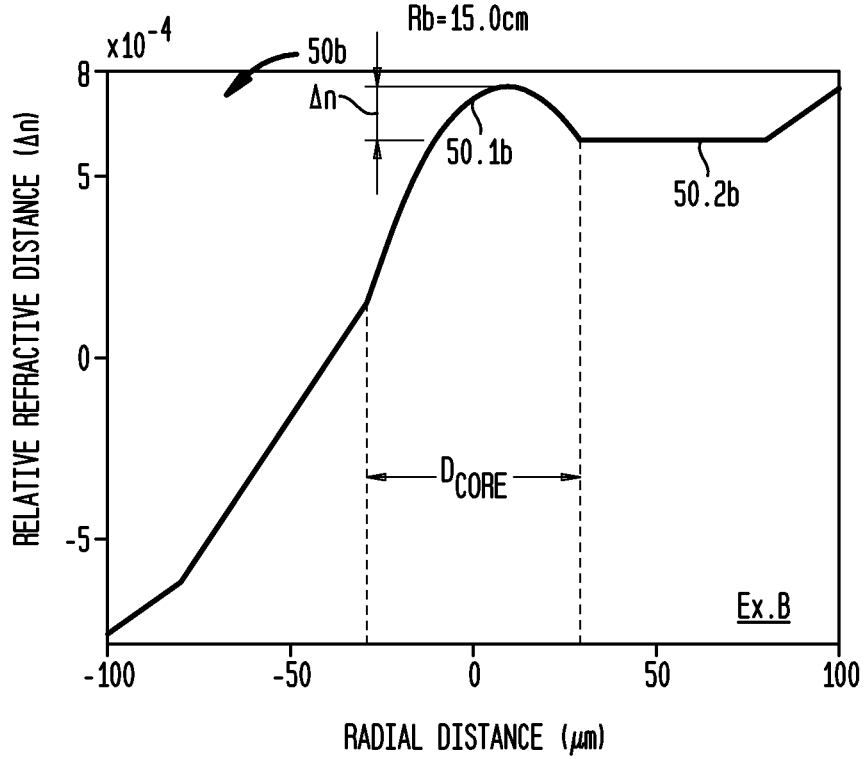

When the above LMA fibers are coiled or bent to a radius $R_b = 15$ cm, our simulations show that the bend-compensated index profiles 40a and 50a of FIGS. 4A and 5A, respectively, change (tilt and reconfigure) to the equivalent index profiles 40b and 50b of FIGS. 4B and 5B, respectively. More specifically, in the coiled or bent fiber the index profile 40b The SBC designs (curves 6.1-6.4) span a range of desirable HOM vs. $A_{eff}$ performance results: some have very large mode areas (~2000 $\mu m^2$; $r_2=160$ $\mu m$; $r_2/r_1=4$; design A3, curve 6.3) with robust single-mode behavior (e.g., a LMA fiber length of 5 m with fundamental loss of only 0.5 dB but HOM loss greater than 100 dB; i.e., the HOM loss is 200× the fundamental mode loss). Others (designs A1, A2 on curve 6.1; design B on curve 6.4) have even more robust single-mode operation (i.e., higher HOM loss) but at the expense of smaller mode areas (e.g., 500-1700 $\mu m^2$).

Among the preferred examples, designs with a relatively thin inner cladding region ($r_2/r_1=2.7$; design B of curve 6.4) still have a very impressive combination of relatively large HOM loss (~100 dB/m) and large $A_{eff}$ (>1000 $\mu m^2$). However, designs with even smaller $r_2/r_1$ show significant degradation of HOM suppression (e.g., $r_2/r_1=2.0$, HOM loss<10 for the right-most point on curve 6.4).

The calculated mode areas include the effect of bend distortion, which means, for example, $A_{eff} \sim 1200$ $\mu m^2$ in FIG. 6 is actually much larger than $A_{eff}$ quoted for the prior art straight LMA fibers having a 40 $\mu m$ MFD (mode-field area of ~1256 $\mu m^2$) since such fibers undergo significant bend-induced distortion and modefield reduction upon bending.

Design B (FIGS. 5A and 5B) has $A_{eff}$~1000 μm$^2$ and huge HOM loss exceeding 100 dB/m. This design, which omits the index step at the interface between the inner and outer cladding regions, may be less sensitive to fiber fabrication variations the index peak of the "bump" (FIG. 5B) is somewhat higher than that of Design A2 (FIG. 4B), although Δn is still approximately 1-2×10$^{-4}$. However, our sensitivity studies indicate that either Design A or Design B and a fabrication irregularity in the fiber index of 10$^{-4}$, can achieve larger mode areas than conventional 50 μm core LMA fibers (e.g., leakage channel fibers; step-index core fibers) with robust single-mode operation, enabled by 50 dB of total HOM suppression over 5 m (a typical length of the GPF in an optical fiber amplifier).

Asymmetric Bend-Compensated (ABC) LMA Fibers

To achieve asymmetry in the overall index profile of an LMA fiber, the parent application points out that it is important to be able to control the refractive index of the glass in minute regions of the fiber cross-section. One way to achieve such control is to fabricate the fiber as a microstructure; that is, a multiplicity of glass cells or voids in which the index of each cell is individually controllable during fabrication and the overall index of a region (e.g., a cell, core, or cladding) is the average of the indices of the cells (and surrounding matrix, if present) within that region.

Thus, microstructure cells may be fabricated, using techniques well known in the art, from commercially available glass (silica) rods that have slightly different refractive indices; e.g., F300 rods are doped with chlorine so that the index of the rod is about 3.5-5×10$^{-4}$ above that of pure silica, and F320 rods are doped with fluorine so that the index of the rod is approximately 6-14×10$^{-4}$ below that of pure silica. Although the diameter of each rod is not critical, it is conveniently in the range of approximately 1-2 mm. Obviously, by arranging F300 and F320 rods in various combinations it is possible to make minute adjustments in the index of cells, and hence the index of various fiber regions. One technique for achieving an index between that of F300 and F320 rods is to overclad one type of glass rod (e.g., F320) with the other type (e.g., F300). By controlling the volume (or cross-sectional area) of each glass rod in the overclad assembly any index between the two can be obtained.

F300 and F320 rods are commercially available from Heraeus Quarzglas GmbH, Hanau, Germany.

Figure 7C:
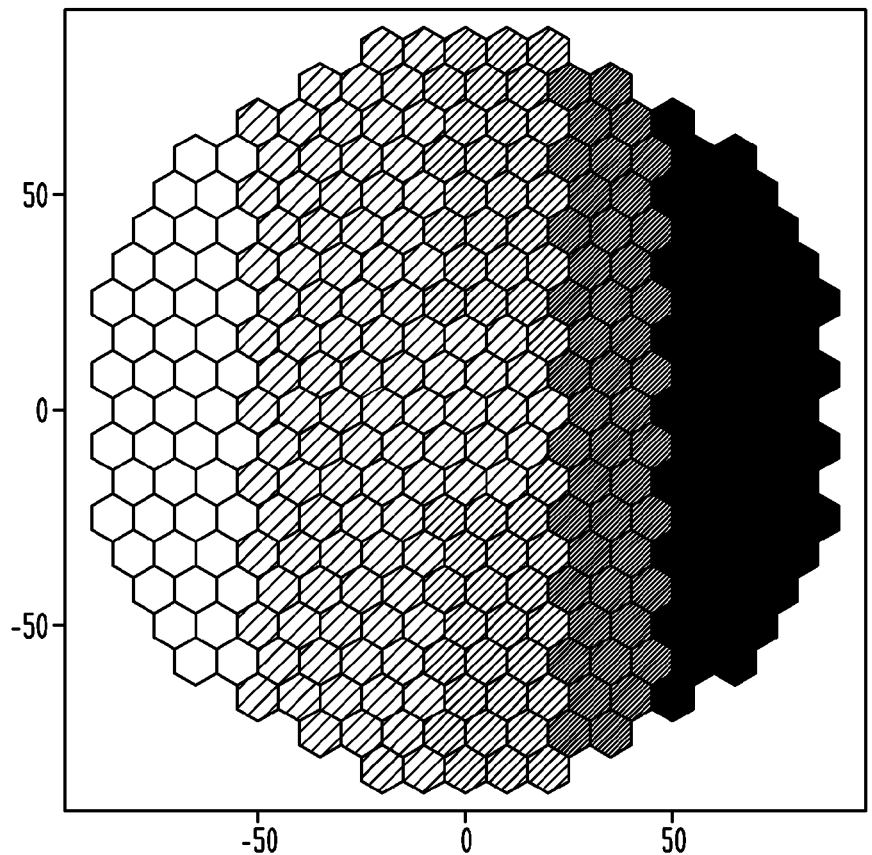

FIGS. 7A and 7C illustrate the index profile of an unbent, microstructured, asymmetric bend-compensated (ABC) fiber in accordance with a second aspect of our invention. A cross-section of the profile is shown in FIG. 7A, while the two-dimensional structure of the profile is illustrated in FIG. 7C. The index profile is comprised of constant-index hexagonal cells arranged in a triangular lattice, with center-to-center spacing L=10 μm between cells. The innermost 19 cells comprise the core region 70.1, so that the core radius $r_1$=2.5 L=25 μm. The cladding extends to $r_2$=9 L=90 μm. The step-wise nature of the profile in FIG. 7A reflects the minute control of the local index within the fiber cross-section. Each step is 10 μm wide, and the index of one step differs from that of any adjacent step by approximately 0.8×10$^{-4}$. The collection of individual index steps are configured to realize an unbent fiber, asymmetric index profile 70a including an approximately circular graded-index core region 70.1, an annular graded-index inner cladding region 70.2, and an annular outer cladding region 70.3.

The core region 70.1 has a radius $r_1$ (e.g., $r_1$=25 μm), and the inner cladding region 70.2 has a thickness $r_2$ $r_1$ (e.g., $r_2$ $r_1$=65 μm). As previously discussed in the description of SBC fibers, here again for HOM suppression the ratio $r_2/r_1$>2 in some embodiments of our ABC fibers, and $r_2/r_1$>3 in others. In the example shown in FIG. 7A, $r_2/r_1$=9 L/2.5 L=3.6. In addition, the steps between adjacent cells (within the core region and within the inner cladding region) approximate a slope of the index profile needed to pre-compensate the bend-induced gradient $\gamma n_{core}/R_b$. That is, the steps approximate a gradient of the index step over the step spacing=0.8×10$^{-4}$/10 μm=8/meter. The bend induced gradient is $\gamma n_{core}/R_b$=0.8(1.45)/15 cm=7.7/meter. Here, we have used the representative value 1.45 for $n_{core}$ the core index is not constant, but the variations in index have a negligible impact on the gradient formula.

In this ABC fiber embodiment, FIG. 7A also illustrates several features that differentiate ABC and SBC designs. First, in ABC designs the graded core index in some portions (on the "left" side of the fiber axis, that is, the portion intended for the inside of the expected bend) extends above that of other portions (on the "right" side of the fiber axis, that is, the portion intended for the outside of the expected bend). Likewise, the graded inner cladding index has two portions: on the left side, the inner cladding index extends above that of the core region, whereas on the right side, it extends below that of the core region. However, when the ABC fiber of FIG. 7A is bent or coiled to a bend radius $R_b$=15 cm, the overall profile changes (tilts and reconfigures) itself, as shown in equivalent index profile of FIG. 7B; that is, the profile 70b flattens across the core and inner cladding regions resulting in, on average, essentially a step-index core profile 70c. The core-to-inner cladding contrast is typically small; in this illustration the contrast is only about 1×10$^{-4}$.

In general, in our ABC designs $r_2$ is measured from the center of the core region to the outermost edge of the annular inner cladding in the direction pointing toward the outside of the bend. Some embodiments of our invention take advantage of an off-center core region to make $r_2$ larger (even though the less relevant distance r1 is made smaller.

An ABC fiber should include a means for fixing the orientation of the fiber cross-section relative to the bend. This fixing means should either mechanically fix the orientation or assist in measuring the orientation, so that orientation alignment can be performed. Such means are known in the art, including placing a marker along its length to identify the azimuthal orientation of the fiber; i.e., the direction in which the fiber should be bent. For example, the fiber cross-section may have a high aspect ratio (e.g., a "ribbon" fiber) to mechanically prevent orientation drift. A marker may include a flat or groove (not shown) located on the outer cladding surface on the outside radius of the bend.

Asymmetric Bend-Compensated (ABC) LMA Fibers—Examples

As described in the parent application, several ABC fiber designs of the type described above have been simulated with cell spacing L, core diameter $D_{core}$=2$r_1$=5 L (19 cells within the core region) and with inner cladding sizes $D_{i\text{-}clad}$=($r_2$-$r_1$)=12 L [$D_{i\text{-}clad}/D_{core}$=$r_2/r_1$=2.4] or in 18 L [$D_{i\text{-}clad}/D_{core}$=$r_2/r_1$=3.6]. In an illustrative design with L=10, the bend-compensating gradient (slope of the inner cladding region 70.2) corresponded to steps along the x-axis of approximately $\gamma \times n_{sil}/R_b$, or approximately 0.8×10$^{-4}$, as shown in FIG. 7A, where $n_{sil}$ is the index of pure silica (a good approximation to $n_{core}$, as indicated earlier) and $R_b$ is assumed to be 15 cm, a fairly large but practical coil size.

A relatively small core-to-inner cladding contrast was used (for the approximate step-index core profile 70c, FIG. 7B) to enhance leakage of HOMs while provide acceptable calculated bend loss for the fundamental mode of 0.1 dB/m. Our simulations confirmed that very large mode area ($A_{eff}$=2160 $\mu m^2$) is compatible with large suppression of HOMs (HOM loss~140 times the fundamental mode loss).

Figure 8:
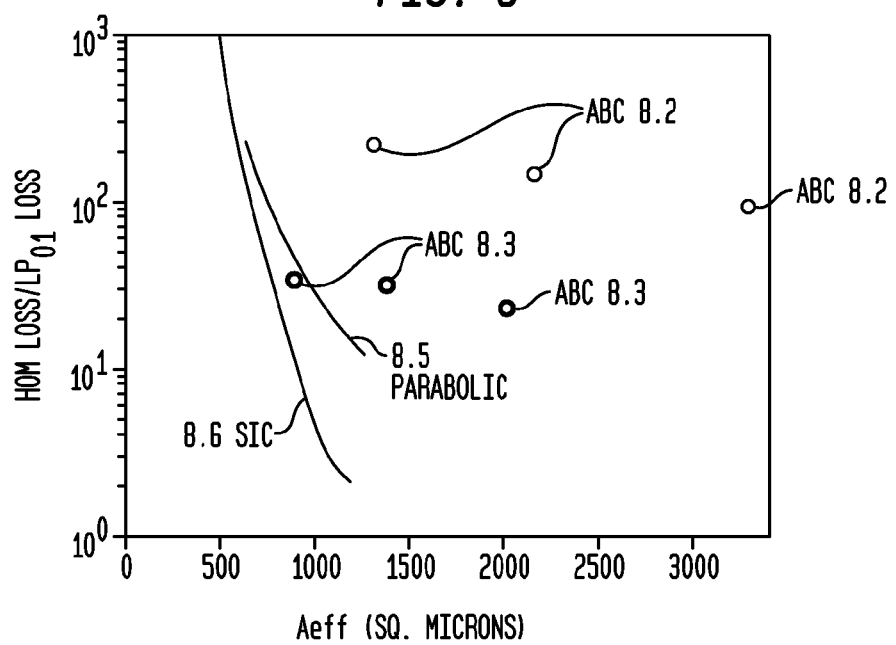
FIG. 8 shows a series of graphs of HOM loss vs. effective area ($A_{eff}$) comparing simulated results for a conventional SIC fiber (curve 8.6), a parabolic core index fiber (curve 8.5) and six ABC optical fibers in accordance with various embodiments of our invention (three data points 8.2 and three data points 8.3);]

The advantages of our ABC strategy can be better understood by comparing the performance tradeoffs of our ABC fibers with several prior art designs, as indicated by FIG. 8. The three-way tradeoff between bend loss, HOM suppression, and effective mode area is summarized there by locking all fiber designs to a calculated bend loss of 0.1 dB/m at $R_b$=15 cm and plotting relative HOM suppression (i.e., HOM loss/fundamental mode loss) vs. $A_{eff}$. The prior art step-index core fiber (curve 8.6) and the prior art parabolic-index core fiber (curve 8.5) reduce to simple curves since they have only two degrees of freedom (contrast is locked/fixed for each core region size by the 0.1 dB/m bend loss requirement). These curves confirm that prior art step-index core designs cannot be scaled significantly above 1000 $\mu m^2$ for typical coiling requirements because of a tradeoff with HOM suppression. Prior art parabolic-core index fibers show a significantly improved tradeoff, but they are still limited in area when significant bend-loss suppression of HOMs is required.

The mode areas of FIG. 8 were calculated at the assumed bend radius of 15 cm, which is a realistic size for a LMA fiber during amplifier operation. This type of calculation is more relevant than straight-fiber areas often quoted in the prior art, which can differ in area by a factor of two or more relative to the bent configuration.

In contrast, our simulated ABC fibers (three data points 8.2, three data points 8.3) illustrate a qualitatively different type of behavior, confirming that our strategy essentially removes the tradeoff with area. The core region size of ABC fibers is increased by scaling L, whereas the contrast is adjusted to meet the loss requirement. The results show that mode area is increased with little impact on the HOM suppression ratio. The HOM suppression is essentially determined by the relative size of the cladding region alone; that is, by the ratio $D_{i\text{-}clad}/D_{core}=r_2/r_1$ alone.

Our ABC fibers can thus remove a fundamental limitation on mode area that constrains prior art strategies. Our fibers can achieve mode areas in the 2000-3000 $\mu m^2$ range with a level of single modedness and thus beam quality analogous to conventional, prior art fibers with much smaller $A_{eff}$~600-700 $\mu m^2$. In the $A_{eff}$~1000 $\mu m^2$ regime, prior step-index and parabolic-index core designs are not only very difficult to make with conventional fabrication methods, they also fail to provide robust HOM suppression even when fabrication is "perfect." For example, a 5 m long step-index core prior art fiber with $A_{eff}$~1000 $\mu m^2$ and <0.5 dB total bend loss can achieve at most a meager 2-3 dB of HOM bend-loss suppression. A prior art parabolic-index core fiber can approach a respectable 10-15 dB of HOM suppression, although actual performance is expected to be worse than ideal calculations. In any case, the performance of these prior art fibers falls well short of total HOM suppression and confirm the actual experiences of actual users: good beam quality is achievable in prior art "hero" experiments but relies heavily on very careful management of input launch, fiber layout and fiber handling.

Finally, we note that, in an optical fiber amplifier, a highly displaced fundamental mode would suffer serious gain-interaction impairment since most of the gain-doped region of the core area would not see the signal light. Calculations demonstrated that our ABC fibers did not exhibit such impairment. Thus, with >100 times relative suppression of HOMs (and 0.5 dB total bend loss), our fibers exhibited a high degree of HOM suppression (>50 dB; essentially complete) for mode areas exceeding 2000 $\mu m^2$ or even exceeding 3000 $\mu m^2$. Mode intensity profiles demonstrated an excellent fundamental mode shape and no displacement, and so the gain-doped region of the core can be tailored for high gain overlap and high gain selectivity.

The ultimate limit of area scaling will be determined by the precision of index control in each cell.

Modified SBC Designs

Figure 12:
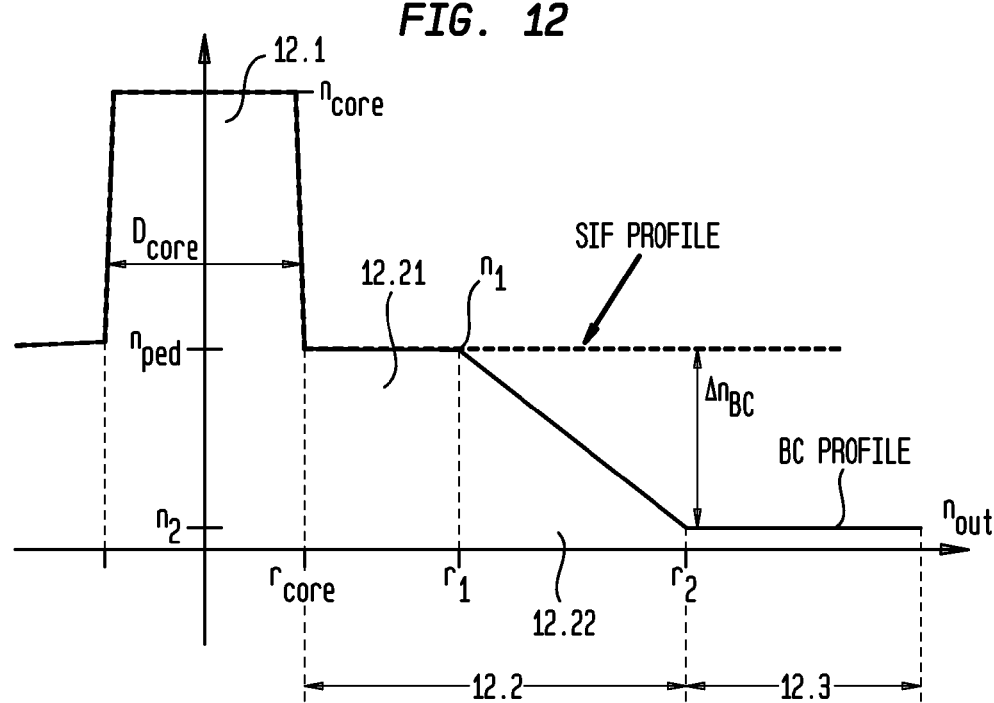
FIG. 12 is a schematic graph of the symmetric refractive index profile of an illustrative bend-compensated (BC) fiber having a pedestal region between the core region and the bend-compensation region, in accordance with one embodiment of the invention.

A symmetric bend-compensated (SBC) design, as shown in FIG. 12, has a core region 12.1 with index $n_{core}$ and diameter $D_{core}$ (radius $r_{core}=D_{core}/2$) surrounded by an inner cladding region 12.2, which in turn is surrounded by an outer cladding region 12.3 with refractive index $n_{out}$. The inner cladding region 12.2 includes a pedestal region 12.21 of outer radius $r_1$ and index $n_{ped}$, which is in turn surrounded by a bend compensation (BC) region 12.22, which is in turn surrounded by an outer cladding region 12.3 of index $n_{out}$. The BC region 12.22 is graded (or stepped to approximate grading) so that its index $n_1$ at the inner radius $r_1$ is greater than its index $n_2$ at the outer radius $r_2$, by an amount $\Delta n_{BC}=(n_1-n_2)$. In this illustration there is no discontinuity at the interface between the pedestal region 12.21 and the BC region 12.22 (i.e., $n_1=n_{ped}$) or at the interface between the outer cladding region 12.3 and the BC region 12.22 (i.e., $n_2=n_{out}$). More generally, however, there could be an index step at either or both of these interfaces. A region of the inner cladding region is considered to be bend compensated if $\Delta n_{BC}/(r_2-r_1)$ is equal to the bend induced bend gradient, which is approximately $0.8 n_{silica}/R_b$ for fibers made of silica glass.

With respect to the design depicted in FIG. 12, we make the following observations:

(1) The mode field area (MFA) is primarily controlled by $D_{core}$;

(2) To achieve large, selective suppression of HOMs, the radial extent of the BC region 12.22 has to be sufficiently large;

(3) It is desirable to have the core contrast ($n_{core}-n_{out}$) large enough to satisfy fabrication constraints. One particular set of desired fabrication guidelines includes the outer cladding region 12.3 being made of available low-cost silica tubes while the core region has sufficient Yb and Al to achieve high gain and low photodarkening. These conditions may imply, for example, ($n_{core}-n_{out}$)>0.0010, or a similar condition depending on the fabrication details; and $r_1$ has an impact on the HOM suppression and the fundamental-mode bend loss; preferred ranges of $r_1/r_{core}$ are provided below.

Some preferred BC designs of the type shown in FIG. 12 are summarized below. One of the parameters that we have utilized as a measure of fiber performance is the "BC ratio" defined as follows:

$$BC \text{ ratio}=0.8(r_2-r_1)\Delta n_{BC}/(n_{silica}R_b) \qquad (2)$$

The BC ratio should be approximately 1.0 for designs achieving bend compensation. We numerically optimized specific designs to have BC ratios between approximately 0.9 and 1.2 for the case where $D_b$=12 cm. Preferred designs have $r_1/r_{core}$~1.6-2.0. For these designs, $n_{ped}=n_1$ (i.e., there is no index step between the pedestal region 12.21) and the BC region 12.22, and ($n_{core}-n_{ped}$) takes on preferred values between approximately 0.0006 and 0.0008.

Index values are given relative to that of pure silica at 633 nm (a wavelength often used for measuring index profiles), so that, for example, $n_{core}=n_{silica}+\Delta n_{core}$, $n_1=n_{silica}+\Delta n_1$, etc.

Other preferred BC designs are obtained if a different bend diameter is used in the optimization. In the designs summarized below we used $D_b$=18 cm. This bend diameter is larger than $D_b$=12 cm, resulting in designs with smaller core contrast than the designs described above for $D_b$=12 cm. The index difference ($n_{core}-n_{out}$) for these designs (while smaller than for $D_b$=12 cm) is still in a very favorable range for fabrication, around ($n_{core}-n_{out}$)~0.0011. These specific numerically optimized designs have BC ratios between approximately 0.8 and 1.2. Preferred designs have $r_1/r_{core}$~1.7-3.0. For these examples, $n_{ped}$=$n_1$ (i.e., again, there is no step between the pedestal region 12.21 and the BC region 12.22) and ($n_{core}-n_{ped}$) takes on preferred values between approximately 0.0005 and 0.0007.

Bend compensated designs of the type described above can be derived from step-index fibers (SIFs) with the same core region index step ($n_{core}-n_{ped}$) and core region diameter ($D_{core}$) as in FIG. 12. The SIF has only two degrees of freedom, and so it is chosen to satisfy the desired mode size (determined primarily by $D_{core}$) and HOM suppression (determined primarily by ($n_{core}-n_{ped}$) and $D_b$), without regard to the bend loss. The BC design can be thought of as a modification of the SIF design, where the graded or stepped BC region 12.22 is added to the inner cladding region 12.2, and where preferably $n_{out}$ is lowered below $n_{ped}$. To a first approximation, the BC design has the same mode area as the corresponding SIF design. Ideally, the BC region does not impede the suppression of HOMs, and so the BC design will have single-modedness comparable to the corresponding SIF design. Addition of the BC region, however, allows the BC design to achieve greatly reduced fundamental-mode bend loss, without greatly sacrificing the mode area and single-modedness of the SIF design. In addition, the larger ($n_{core}-n_{put}$) of the BC design (compared to ($n_{core}-n_{ped}$) for the SIF) makes the design more compatible with preferred composition of the core region 12.1 and outer cladding region 12.3. This derivation is conceptual but suggests some of the same preferred parameters as more detailed calculations. To achieve ($n_{core}-n_{ped}$)<0.0008] may also be preferred based on known principles for determining regimes of effectively single-moded operation in a SIF, which may include a bend.

As noted above, the graded region 12.22 is schematically depicted as having an essentially linear refractive index slope. In the following discussion, we describe alternative embodiments wherein such an index slope is realized by a multiplicity of index steps forming a staircase, which approximates the desired graded (e.g., linear) profile. Grading functions other than linear (e.g., curved) may also be suitable.

Figure 13C:
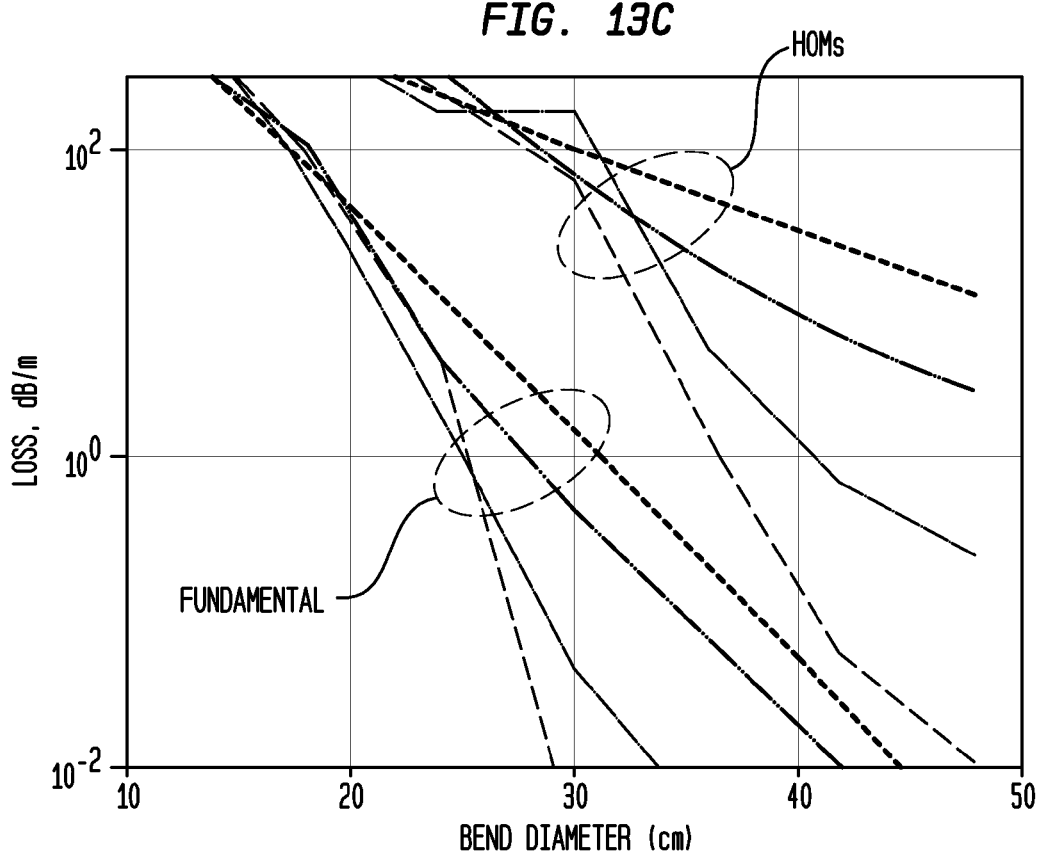
FIG. 13C depicts the simulated mode loss versus bend diameter for both the fundamental mode and the HOMs.
Figure 13A:
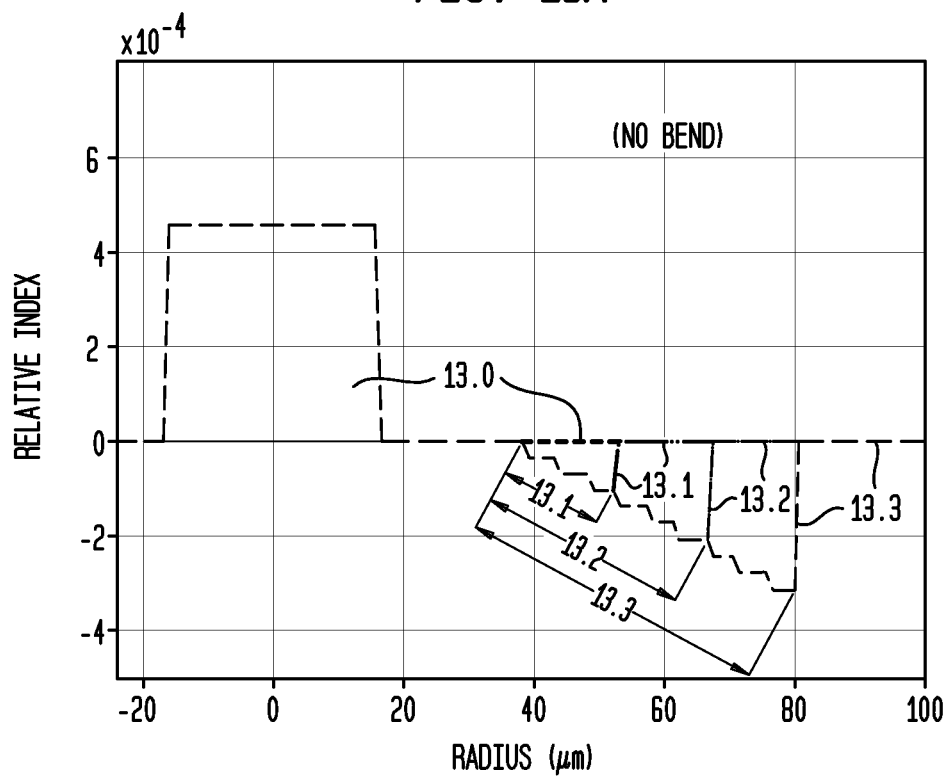
FIG. 13A shows a series of three schematic graphs of the symmetric refractive index profiles of illustrative bend-compensated fibers in which the gradations/slopes of the BC regions are approximated by a different multiplicity of index steps within each BC region (3 steps in BC region 13.1; 6 steps in BC region 13.2; and 9 steps in BC region 13.3), in accordance with several embodiments of the invention of type depicted in FIG. 12.
Figure 13B:
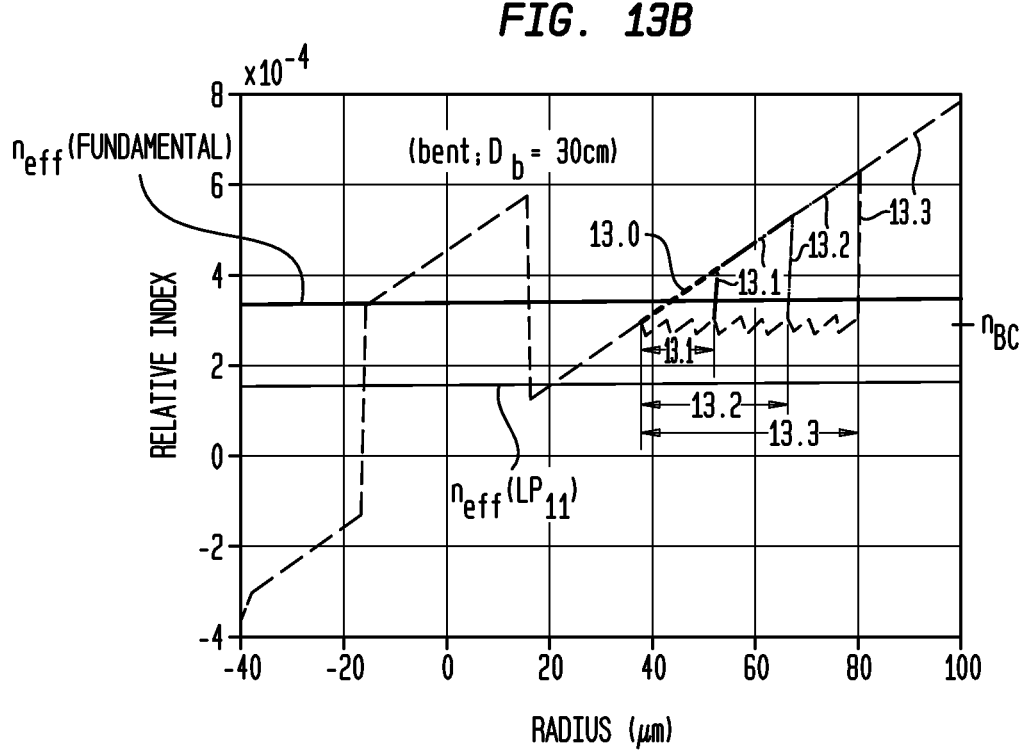
FIG. 13B shows the profile in the presence of a bend having a 30 cm diameter. The latter demonstrates an important feature of the invention; namely, the relative index of the BC region ($n_{BC}$) lies between the effective index of the fundamental mode [$n_{eff}$(fundamental)] and the effective index of the $LP_{ii}$ HOM [$n_{eff}(LP_{11})$] such that $$n_{eff}(LP_{11}) < N_{BC} \lesssim appx\ n_{eff}(\text{fund}), \quad (1)$$

The simulations illustrated by FIGS. 13A-13C show the conceptual construction of a fiber having a BC region in which the BC index profile is stepwise graded. For comparison purposes, we start with SIFs that have 100 dB/m of HOM suppression at a 30 cm bend diameter. The index profile plot (FIG. 13A; no bend) shows one such SIF (13.0) and three BC fibers (13.1, 13.2, 13.3) constructed from it with stepwise-graded BC regions of increasing width. The loss plot (FIG. 13C) shows HOM loss (dashed lines) and fundamental loss (solid lines) as a function of bend diameter. At the intended bend diameter of operation (30 cm), the HOM suppression shows very little variation as the width of the BC region increases, since $r_1$ and the BC index slope are chosen so that the BC region does not hinder leakage of HOMs. The bend loss of the fundamental mode is reduced by the BC region (trench) and is negligible for large enough width of the BC region. In the plot of equivalent index including the bend perturbation (FIG. 13B), we see that $r_1$ is chosen so that the equivalent index in the BC region is substantially above the effective index of the $LP_{ii}$ mode. It is also chosen such that the equivalent index in the BC region is not substantially greater than the effective index of the fundamental mode. (In this example, it is strictly less than the fundamental mode's effective index, but this is not generally required). If $r_1$ is too small, the equivalent index of the BC region will not fall substantially above the LP11 effective index, and so there will be greater degradation in HOM suppression as $r_2$ is increased, and so the tradeoff will not be as completely overcome. If $r_1$ is too large, the equivalent index of the BC region will fall substantially above the fundamental mode effective index, and the BC region will not reduce the fundamental mode loss as effectively.

In accordance with one embodiment of the present invention, as depicted in FIGS. 1 & 12, for example, we show a LMA SBC fiber for use in relatively tight bend applications; that is, applications where bend diameters less than 30 cm are anticipated. Illustratively, such tight bends are characterized by bend diameters between 8 and 24 cm, typically between 10 and 20 cm, and even more typically between 12 and 18 cm. Under such circumstances bend compensation is achieved by designing the fiber to have a higher core-to-outer cladding index contrast ($n_{core}-n_{out}$) and a larger, steeper gradient in the bend-compensation region. By a higher index contrast we mean the core region has an index ($n_{core}$) more than approximately 0.0010 above the index of the outer cladding region ($n_{out}$); that is, ($n_{core}-n_{out}$)≥0.0010 approximately. As mentioned previously, this contrast level is highly desirable because it allows simultaneous use of a relatively undoped outer cladding region and a heavily up-doped core region.

In accordance with another embodiment of the present invention, as depicted in FIGS. 1 & 12, for example, ($n_1-n_2$)>($r_2-r_1$)×$10^{-5}$/μm. Illustratively, ($r_2-r_1$)=30 μm.

Figure 14A:
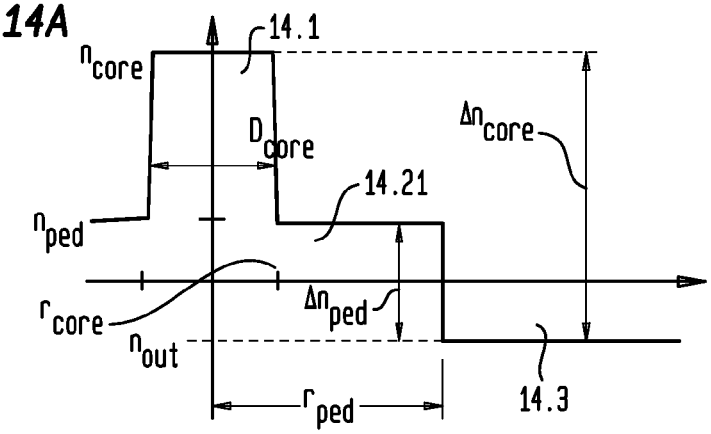
FIG. 14A is a schematic graph of the symmetric refractive index profile of an illustrative bend-compensated fiber having a single-step BC region between the core region and the outer cladding region, in accordance with another embodiment of the invention.
Figure 14B:
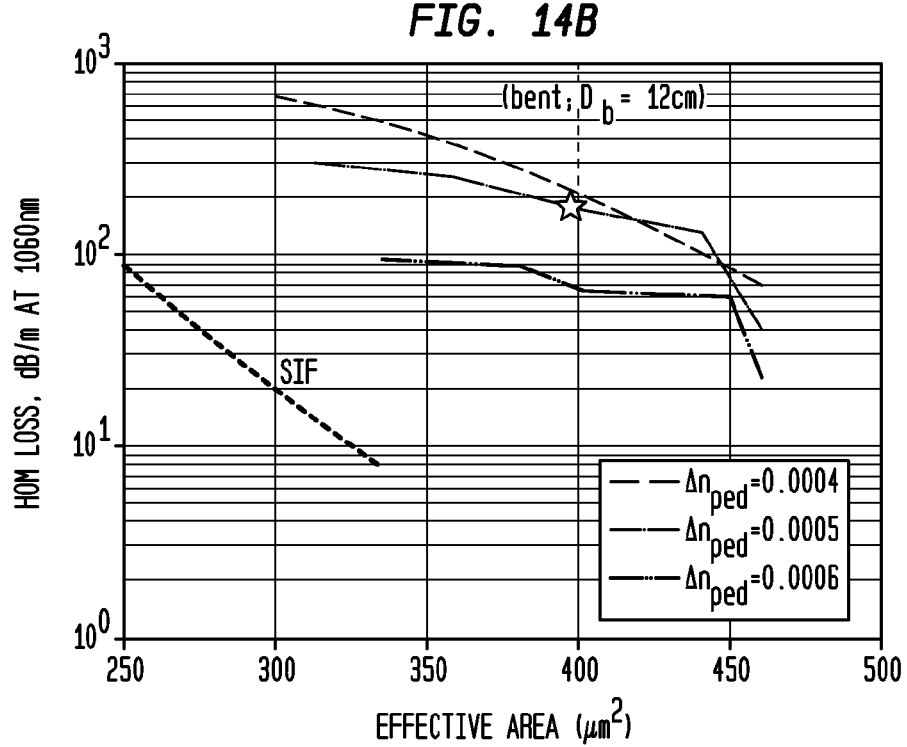
FIG. 14B is a performance tradeoff plot of HOM loss versus effective mode area for a bend diameter of 12 cm.

In yet another embodiment of the present invention, as depicted in FIGS. 1 & 12, the index profile of the fiber is configured so that ($n_{core}-n_{out}$)>0.0010, ($n_{core}-n_{ped}$)>0.0009, and ($n_{ped}-n_{out}$)>0.0009, As noted in the previous description of FIG. 12, designs of the present invention include a pedestal region that surrounds the core region. We now discuss such pedestal designs further with reference to FIGS. 14A & 14B. Thus, a pedestal design has a core region 14.1 with index $n_{core}$ and diameter $D_{core}$ (radius $r_{core}=D_{core}/2$) surrounded by a pedestal region 14.21 of outer radius $r_{ped}$ and index $n_{ped}$, which is in turn surrounded by an outer cladding region 14.3 of index $n_{out}$. The pedestal region index step is thus $\Delta n_{ped}$=($n_{ped}-n_{out}$) We have simulated many examples of pedestal designs that achieve very high HOM loss, and where the single step coarsely approximates a BC region in the inner cladding region. The performance tradeoff plot assuming 12 cm bend diameter and fundamental loss≤0.02 dB/m is shown in FIG. 14B for three values of pedestal step ($\Delta n_{ped}$) in the preferred range of approximately 0.0004 to 0.0006. Large HOM suppression (>>1 dB/m) is achieved at mode areas much larger than SIF designs.

Specific design parameters have been determined as a function of $D_{core}$ for designs corresponding to FIG. 13. Preferred embodiments have $r_{ped}/r_{core}$ between 2.8 and 3.3 approximately. Specifically $r_{ped}/r_{core}$~3.2 is preferred for $D_{core}$=20 μm, $r_{ped}/r_{core}$~3.0 is preferred for $D_{core}$=26 μm, and $r_{ped}/r_{core}$~2.9 is preferred for $D_{core}$=32 μm. On the other hand, $\Delta n_{core}=(n_{core}-n_{clad}$) is preferably in the range of approximately 0.0012 to 0.0015. The core region step ($n_{core}-n_{ped}$) is preferably in the range of approximately 0.0007-0.0009. The core region diameter can be chosen from straightforward plot of the mode effective area ($A_{eff}$) as a function of core region diameter. Mode effective area can be related by standard means to power limits and other specifications of a fiber amplifier, laser, delivery fiber, or transmission link. For a bent-fiber $A_{eff}$ is approximately 320 $\mu m^2$ for $D_{core}$=20 $\mu m$, 400 $\mu m^2$ for core=26 $\mu m$, and 450 $\mu m^2$ for $D_{core}$=32 $\mu m$.

Our simulations have shown that preferred designs have $r_{ped}/r_{core}$~2.5-4.0. For these examples, ($n_{core}-n_{ped}$) takes preferred values in the range of approximately 0.0007 to 0.0009, while ($n_{core}-n_{out}$) takes preferred values between approximately 0.0012 and 0.0016.

Viewed from a slightly different perspective, the BC fiber of FIG. 12 comprises an inner portion including a core region 12.1 and a lower refractive index inner cladding region 12.21 surrounding the core region, an intermediate portion 12.22 surrounding the inner cladding region 12.21, and an outer portion 12.3 surrounding the inner portion. The inner portion is configured to provide higher loss to HOMs than to the fundamental mode, and the intermediate portion is configured so that the equivalent refractive index of the fiber when bent is greater than the effective refractive index of the HOMs and less than or equal to the effective refractive index of the fundamental mode.

Fabricated fiber profiles always differ from design targets, and so a sensitivity calculation was done where random ripples of size $\Delta n_{rand}$=2×10$^{-4}$ were added to the ideal profiles, along with burnoff. If possible, once the fiber is fabricated, one should adjust the bend radius for that fiber (customizing the fiber arrangement to optimize the performance of each particular fiber). Our simulations show the tradeoff between mode area and HOM loss, assuming $D_b$ is adjusted to achieve 0.02 dB/m fundamental bend loss for each fiber. HOM suppression was ten times better for these imperfect pedestal fibers than for ideal SIF (perfect fabrication).

A random distribution of fibers with fabrication imperfections may all need to be used with a single bend, for example if the arrangement of fiber in a package cannot be modified after fiber fabrication. One would then like to know the yield of fibers, or fraction of the distribution that simultaneously satisfies HOM suppression and fundamental bend loss requirements. Our simulations show that 75% of the simulated fibers with $D_{core}$=26 $\mu m$ achieve excellent HOM suppression; i.e., 2 dB/m HOM loss and 0.02 dB/km fundamental bend loss.

Figure 15:
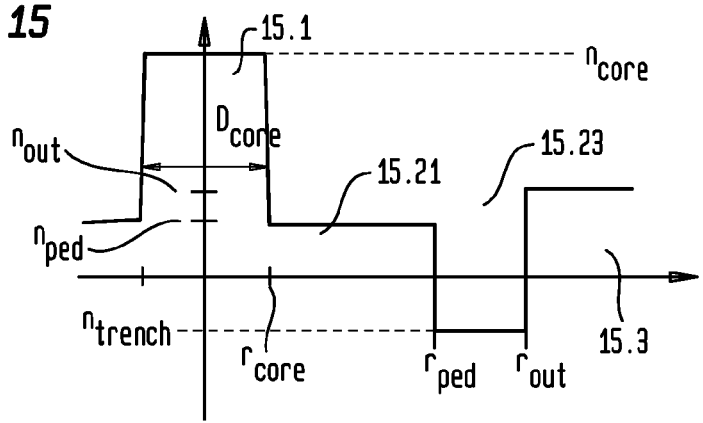
FIG. 15 is a schematic graph of the symmetric refractive index profile of an illustrative bend-compensated fiber having a single-step BC region between the core region and the outer cladding region as well as a raised-index outer cladding such that $n_{out} > n_{ped}$, in accordance with yet another embodiment of the invention.

A pedestal design can optionally have a raised-index outer cladding outside of the inner cladding layer, as shown in FIG. 15. In this figure, the core region (index $n_{core}$) is surrounded by a pedestal region 15.21 (index $n_{ped}$), which is in turn surrounded by a trench region (index $n_{trench}$), which is in turn surrounded by an outer cladding region 15.3 (index $n_{out}$).

In our simulations of fibers with pedestal designs and raised outer cladding index, we numerically optimized some designs that exhibited the following preferred ranges: $r_{ped}/r_{core}$~2.9-3.6, $r_{out}$~40-60 $\mu m$, and ($n_{core}-n_{ped}$)~0.0009 to 0.0011. Specific values for ($n_{ped}-n_{trench}$) cladding are 0.0003, 0.0005, and 0.0007, but additional simulations indicate a favorable range between approximately 0.0002 and 0.0012. These examples have $n_{out}$=$n_{ped}$, but generally the listed optical properties are insensitive to $n_{out}$.

The inventive fibers are designed for use in a variety of applications, but by way of illustration we describe below their use in high power optical fiber amplifiers.

Applications

Figure 9:
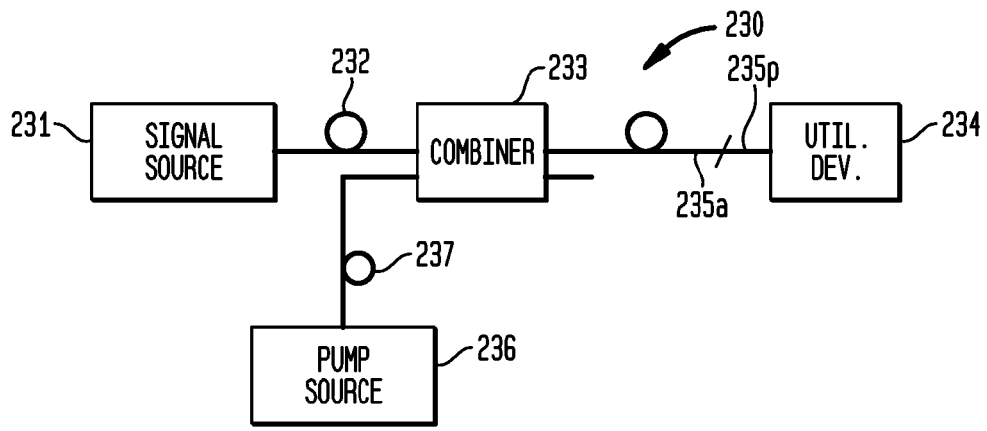
FIG. 9 is a schematic block diagram depicting an illustrative optical fiber amplifier employing a LMA GPF in accordance with an illustrative embodiment of our invention.

A principal application of our invention is depicted in FIG. 9, a high power (e.g., >300 W optical output) optical fiber amplifier 230 comprising a LMA gain-producing optical fiber (GPF) 235a optically coupled to an optional LMA pigtail fiber 235p. GPF 235a is optically coupled to a combiner 233, and pigtail fiber 235p is optically coupled to a utilization device 234. Either GPF 235a or pigtail 235p, or both, is designed in accordance with our invention; that is, since either or both of these LMA fibers would typically be coiled inside the amplifier package, either or both would be designed to have a bend-compensated inner cladding region as previously described.

Figure 10:
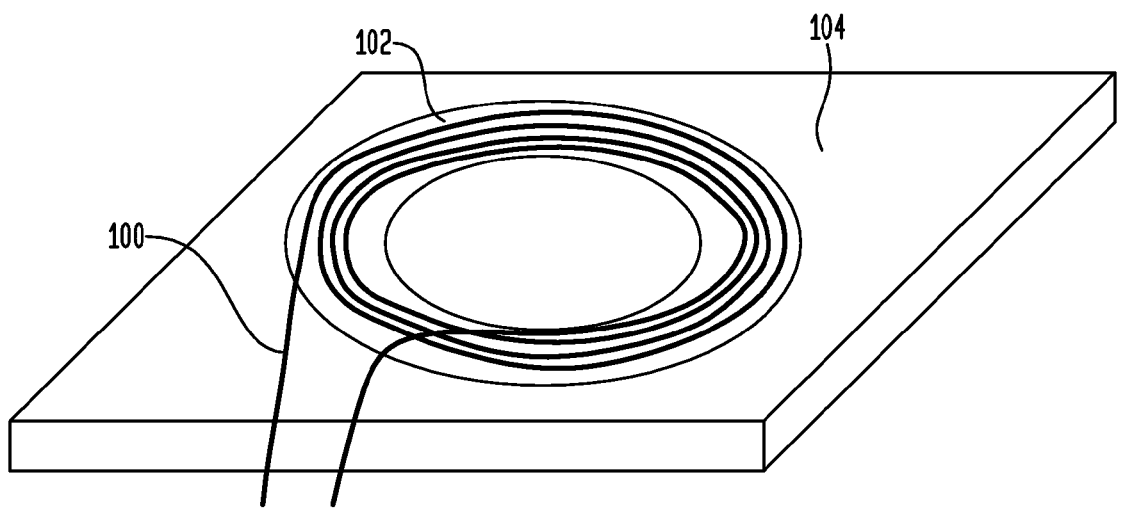
FIG. 10 is a schematic, isometric view of a subassembly in which a coiled fiber is mounted within a groove on a plate in accordance with an illustrative embodiment of our invention.
Figure 11:
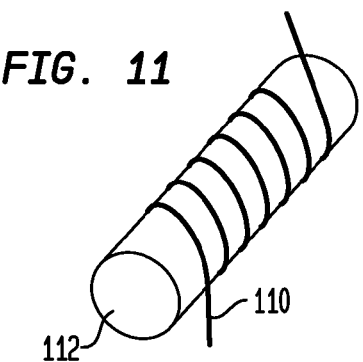
FIG. 11 is a schematic, isometric view of another subassembly in which a coiled fiber is mounted on a mandrel in accordance with another illustrative embodiment of our invention.

In a typical commercially available amplifier package, coiled LMA fibers 100 (FIG. 10) or 110 (FIG. 11) are mounted on a plate 104 or a mandrel 112, respectively. LMA fiber 110 (FIG. 11) is wound helically on mandrel 112, whereas LMA fiber 100 (FIG. 1) is wound within a flat, circular groove 102 in a major surface of plate 104. In each case, the plate 104 or the mandrel 112 serves as a support member, serves to define (and hence predetermine) the bend radius $R_b$ and fiber orientation (if necessary), and provides heat sinking. To this end, the plate or mandrel is made of material having a relatively high thermal conductivity (e.g., copper). Furthermore, in each case the LMA fiber may be affixed to the support member by any of several means; e.g., by sticky material such as double-sided adhesive tape within groove 102 or on the cylindrical surface of mandrel 112, or by potting material such as silicone applied after the fiber is wound on the plate or mandrel.

For use as a pigtail delivery fiber, pigtail 235p can be held in a helix inside a cable, with diameter and pitch configured to produce the desired local bend radius.

In relatively low power telecommunication applications, combiner 233 is known as a wavelength division multiplexer (i.e., a WDM); in high power applications it is known as a pump-combiner (e.g., a tapered fiber bundle, or bulk optic components). For simplicity, hereinafter we will describe this aspect of our invention in the context of high power applications. In this case, the pump-combiner 233 couples the outputs of an optical input signal source 231 and an optical pump source 236 into the GPF 235a. The input signal source 231 generates a first-wavelength optical input signal, which is coupled to an input of combiner 233 via a conventional fiber 232 or via bulk optics (not shown), whereas the pump source 236 generates a second-wavelength optical pump signal, which is coupled by a conventional, typically multimode, fiber 237 to another input of combiner 233.

As is well known in the art, the pump signal generates a population inversion in the GPF 235a, which amplifies the input signal from input source 231. The amplified input signal propagates along GPF 235a (and through pigtail 235p, if present) to utilization device 234. In high power applications the latter may include myriad well known devices or apparatuses; e.g., another optical amplifier, a beam collimator, a lens system, a work piece (e.g., for cutting or welding).

Illustratively, the input source 231 is a laser that generates a relatively low power optical input signal at a wavelength in the amplification range of the GPF 235a, whereas the pump source 236 is preferably a semiconductor laser, but optionally could be an array of semiconductor light emitting diodes (LEDs). In either case, pump source 236 generates a relatively high optical power (e.g., above about 150 mW) pump signal at a shorter wavelength that produces the desired amplification of the input signal. Illustratively, the GPF 235a is rare-earth-doped fiber (e.g., preferably a ytterbium-doped fiber) or optionally a chromium-doped fiber. In the preferred ytterbium fiber case, the signal source 231 generates an input signal having a wavelength of about 1080 nm, and the pump source 236 generates a pump signal at a wavelength of about 915 nm, or alternatively at about 975 nm.

Although the amplifier 230 of FIG. 12 depicts a common co-propagating pump configuration (i.e., the pump and input signals propagate in the same direction through the GPF), it is also possible to use a counter-propagating configuration (i.e., the pump and input signals propagate in opposite directions through the GPF). In addition, a multiplicity of amplifiers may be arranged in tandem, a scheme that is well known in the art for increasing the total gain of a high power multi-stage system. Pump energy may also be transversely coupled into the amplifier.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

In particular, the optical amplifier described above may be modified to function as a laser by providing a well-known optical resonator [e.g., by using fiber Bragg gratings or bulk optic elements (e.g., mirrors) to provide optical feedback]. Such a laser could be used as a femtosecond oscillator, which is known to produce high peak power optical pulses. As such, nonlinearity tends to be a problem, which can be ameliorated by using bend-compensated LMA fibers in accordance with our invention.

When the amplifier apparatus is configured to operate as a laser, then signal source 231 is omitted and the signal light described above would be equivalent to the stimulated emission generated internally by the laser.

We claim:

1. A bend-compensated LMA optical fiber comprising:
    a core region having a longitudinal axis, a refractive index $n_{core}$ and a radius $r_{core}$,
    a cladding region surrounding said core region, said core and cladding regions configured to support and guide the propagation of signal light at a predetermined wavelength $\lambda$ in a fundamental transverse mode in said core region in the direction of said axis, wherein the effective mode area of said LMA fiber is at least $300\lambda^2$,
    said fiber being characterized by a transverse cross-section that is further characterized by a refractive index profile,
    said cladding region including an inner cladding region surrounding said core region and an outer cladding region having a refractive index $n_{out}$ and surrounding said inner cladding region, wherein said inner cladding region comprises at least a transverse portion in which said index profile is graded with a slope, wherein $n_{core}-n_{out}>0.0010$,
    at least a longitudinal segment of said fiber that, when bent or coiled to a bend radius $R_b$, said bending or coiling would introduce a change to said index profile within said segment, and
    at least said longitudinal segment being pre-compensated in that (i) said index profile is approximately azimuthally symmetric with respect to said axis and (ii) the refractive index of at least said transverse portion is configured to compensate for said change associated with said fiber being bent or coiled.

2. The fiber of claim 1, wherein $n_{core}-n_{out}>0.0012$.

3. The fiber of claim 2, wherein $n_{core}-n_{out}>0.0015$.

4. The fiber of claim 1, wherein at least a portion of said core region includes gain-producing species.

5. A bend-compensated LMA optical fiber comprising:
    a core region having a longitudinal axis, a refractive index $n_{core}$ and a radius $r_{core}$,
    a cladding region surrounding said core region, said core and cladding regions configured to support and guide the propagation of signal light at a predetermined wavelength $\lambda$ in a fundamental transverse mode in said core region in the direction of said axis, wherein the effective mode area of said LMA fiber is at least $300\lambda^2$,
    said fiber being characterized by a transverse cross-section that is further characterized by a refractive index profile,
    said cladding region including an inner cladding region surrounding said core region and an outer cladding region having a refractive index $n_{out}$ and surrounding said inner cladding region, wherein said inner cladding region comprises at least a transverse portion in which said index profile is graded with a slope from a refractive $n_1$ at a radius $r_1$ to a refractive index $n_2$ at a radius $r_2$, wherein $n_1>n_2$, $r_2>r_1$, and $(n_1-n_2)>(r_2-r_1)\times10^{-5}/\mu m$,
    at least a longitudinal segment of said fiber that, when bent or coiled to a bend radius $R_b$, said bending or coiling would introduce a change to said index profile within said segment, and
    at least said longitudinal segment being pre-compensated in that (i) said index profile is approximately azimuthally symmetric with respect to said axis and (ii) the refractive index of at least said transverse portion is configured to compensate for said change associated with said fiber being bent or coiled.

6. The fiber of claim 5, wherein $(r_2-r_1)>30$ μm.

7. A bend-compensated LMA optical fiber comprising:
    a core region having a longitudinal axis, a refractive index $n_{core}$ and a radius $r_{core}$,
    a cladding region surrounding said core region, said core and cladding regions configured to support and guide the propagation of signal light at a predetermined wavelength $\lambda$ in a fundamental transverse mode in said core region in the direction of said axis, wherein the effective mode area of said LMA fiber is at least $300\lambda^2$,
    said fiber being characterized by a transverse cross-section that is further characterized by a refractive index profile,
    said cladding region including a pedestal region having a refractive index $n_{ped}$ and surrounding said core region and further including an outer cladding region having a refractive index $n_{out}$ and surrounding said pedestal region, wherein $(n_{core}-n_{out})>0.0010$, $(n_{core}-n_{ped})>0.0009$, and $(n_{ped}-n_{out})>0.0009$,
    at least a longitudinal segment of said fiber that, when bent or coiled to a bend radius $R_b$, said bending or coiling would introduce a change to said index profile within said segment, and
    at least said longitudinal segment being pre-compensated in that (i) said index profile is approximately azimuthally symmetric with respect to said axis and (ii) the refractive index of at least said transverse portion is configured to compensate for said change associated with said fiber being bent or coiled.

8. The fiber of claim 7, wherein said cable is configured so that said fiber inside said cable is approximately helical.

9. A bend-compensated LMA optical fiber comprising:
    a core region having a longitudinal axis, a refractive index $n_{core}$ and a radius $r_{core}$, a cladding region surrounding said core region, said core and cladding regions configured to support and guide the propagation of signal light at a predetermined wavelength $\lambda$ in a fundamental transverse mode in said core region in the direction of said axis, wherein the effective mode area of said LMA fiber is at least $300\lambda^2$, said fiber being characterized by a transverse cross-section that is further characterized by a refractive index profile, said cladding region including an inner cladding region surrounding said core region and an outer cladding region having a refractive index $n_{out}$ and surrounding said inner cladding region, wherein said inner cladding region comprises at least a transverse portion in which said index profile is graded with a slope, at least a longitudinal segment of said fiber that, when bent or coiled to a bend radius $R_b$, said bending or coiling would introduce a change to said index profile within said segment, and at least said longitudinal segment being pre-compensated in that (i) said index profile is approximately azimuthally symmetric with respect to said axis and (ii) the refractive index of at least a transverse portion of said segment is configured to compensate for said change associated with said fiber being bent or coiled, wherein said fiber is cabled so that the local radius of curvature of said fiber is approximately equal to $R_b$.

10. A bend-compensated LMA optical fiber comprising
an inner portion including a core region having a longitudinal axis and a lower refractive index inner cladding region surrounding said core region, said core region and said inner cladding region configured to guide and support the propagation of signal light in a fundamental mode in said core region, an intermediate portion surrounding said inner cladding region, and an outer portion surrounding said inner portion, wherein said inner portion is configured to provide higher loss to higher-order modes than to the fundamental mode, and wherein said intermediate portion is configured so that the equivalent refractive index of said fiber when bent is greater than the effective refractive index of said higher-order modes and less than or equal to the effective refractive index of said fundamental mode.

11. The fiber of claim 10, wherein
at least a longitudinal segment of said fiber, including said intermediate portion, that, when bent or coiled to a bend radius $R_b$, said bending or coiling would introduce a change to said index profile within said intermediate portion, and at least said intermediate portion being pre-compensated in that (i) said index profile is approximately azimuthally symmetric with respect to said axis and (ii) the refractive index of at least said intermediate portion is configured to compensate for said change.

* * * * *